United States Patent
Lee et al.

(10) Patent No.: US 10,081,319 B2
(45) Date of Patent: Sep. 25, 2018

(54) VEHICLE AND CONTROL METHOD THEREOF

(71) Applicant: Hyundai Motor Company, Seoul (KR)

(72) Inventors: Young Il Lee, Gyeonggi-do (KR); Heeseung Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/435,605

(22) Filed: Feb. 17, 2017

(65) Prior Publication Data
US 2018/0141508 A1 May 24, 2018

(30) Foreign Application Priority Data

Nov. 18, 2016 (KR) .................. 10-2016-0153858

(51) Int. Cl.
*B60R 16/03* (2006.01)
*B60R 16/033* (2006.01)
*B60R 16/037* (2006.01)
*B60R 16/023* (2006.01)

(52) U.S. Cl.
CPC ...... *B60R 16/0307* (2013.01); *B60R 16/0232* (2013.01); *B60R 16/0237* (2013.01); *B60R 16/033* (2013.01); *B60R 16/037* (2013.01)

(58) Field of Classification Search
CPC . B60R 16/03; B60R 16/0307; B60R 16/0315; B60R 16/033
USPC .......................................................... 701/36
See application file for complete search history.

(56) References Cited

U.S. PATENT DOCUMENTS

| | | | |
|---|---|---|---|
| 7,629,706 B2 | 12/2009 | Yamaguchi | |
| 7,683,767 B2 | 3/2010 | Hara et al. | |
| 8,288,889 B2 * | 10/2012 | Holmberg | B63B 27/10 307/35 |
| 8,306,698 B2 * | 11/2012 | Suzuki | B62D 5/0457 180/402 |
| 9,030,162 B2 * | 5/2015 | Andersson | B60K 6/46 320/109 |
| 2004/0084232 A1 * | 5/2004 | Obayashi | H02J 1/14 180/65.28 |
| 2007/0245161 A1 * | 10/2007 | Shaw | G06F 1/3203 713/300 |

(Continued)

FOREIGN PATENT DOCUMENTS

| | | |
|---|---|---|
| JP | 2006182198 A | 7/2006 |
| JP | 2008087534 A | 4/2008 |

(Continued)

*Primary Examiner* — Thomas G Black
*Assistant Examiner* — Sara J Lewandroski
(74) *Attorney, Agent, or Firm* — Mintz Levin Cohn Ferris Glovsky and Popeo, P.C.; Peter F. Corless

(57) ABSTRACT

A vehicle is provided capable of minimizing inconvenience due to power limitation. The vehicle includes a generator that generates power, a plurality of electric components that receive the power from the generator, and a battery that stores part of the power generated by the generator. A body control module calculates power availability from an amount of power generation of the generator, an amount of charge of the battery, and an amount of power consumption of the plurality of electric components, and limits the operations of the plurality of electric components in a first order when the power availability is less than predetermined reference availability.

18 Claims, 18 Drawing Sheets

(56) References Cited

U.S. PATENT DOCUMENTS

| | | | | |
|---|---|---|---|---|
| 2015/0303693 A1* | 10/2015 | Wu | ............................ | H02J 3/14 |
| | | | | 307/31 |
| 2016/0046292 A1* | 2/2016 | Miyashita | ............... | F02D 17/02 |
| | | | | 701/36 |
| 2017/0032673 A1* | 2/2017 | Scofield | ............... | G08G 1/0112 |
| 2017/0309094 A1* | 10/2017 | Farahat | .................. | G07C 5/008 |

FOREIGN PATENT DOCUMENTS

| | | | |
|---|---|---|---|
| JP | 2009253993 A | * | 10/2009 |
| KR | 10-1330069 B1 | | 11/2013 |

\* cited by examiner

FIG. 8

| POWER-SAVING STAGE | REFERENCE AVAILABILITY(%) | ELECTRIC COMPONENTS | OPERATION LIMITATION |
|---|---|---|---|
| 1 | 80 | ELECTRIC ASSISTANT HEATER | DELAY TURN-ON TIME |
| | 78 | REAR WINDOW HEATER | DELAY TURN-ON TIME |
| | 76 | FRONT & REAR SEAT HEATERS | DELAY TURN-ON TIME |
| | 74 | FRONT & REAR ARMREST HEATERS | DELAY TURN-ON TIME |
| 2 | 70 | FRONT SEAT HEATER | OPERATE WITH LOW POWER |
| | 68 | FRONT ARMREST HEATER | OPERATE WITH LOW POWER |
| | 66 | REAR SEAT HEATER | OPERATE WITH LOW POWER |
| | 64 | REAR ARMREST HEATER | OPERATE WITH LOW POWER |
| | 56 | STEERING WHEEL HEATER | OPERATE WITH LOW POWER |
| 3 | 50 | SIDE-VIEW MIRROR HEATERS | CUT OFF |
| | 48 | STEERING WHEEL HEATER | CUT OFF |
| | 44 | FRONT & REAR ARMREST HEATERS | CUT OFF |
| | 40 | FRONT & REAR SEAT HEATERS | CUT OFF |
| | 38 | ELECTRIC ASSISTANT HEATER | CUT OFF |
| | 36 | REAR WINDOW HEATER | CUT OFF |
| | 30 | FRONT BLOWER | CUT OFF |

| TEMPERATURE |
|---|
| -30°C BELOW |
| -20°C ~ -30°C |
| -10°C ~ -20°C |
| 0°C ~ -10°C |
| 10°C ~ 0°C |
| 20°C ~ 10°C |
| 30°C ~ 20°C |
| 30°C ABOVE |

| HUMIDITY |
|---|
| 20 BELOW |
| 20 ~ 30 |
| 30 ~ 40 |
| 40 ~ 50 |
| 50 ~ 60 |
| 60 ~ 70 |
| 70 ABOVE |

| INDEPENDENTLY CONTROLLED LOAD | USE RATE(%) | ORDER OF OPERATION LIMITATION |
|---|---|---|
| ELECTRIC ASSISTANT HEATER | 30 | 4 |
| REAR WINDOW HEATER | 10 | 1 |
| FRONT SEAT HEATER | 95 | 9 |
| FRONT ARMREST HEATER | 80 | 8 |
| REAR SEAT HEATER | 35 | 5 |
| REAR ARMREST HEATER | 21 | 3 |
| STEERING WHEEL HEATER | 72 | 7 |
| SIDE-VIEW MIRROR HEATERS | 12 | 2 |
| FRONT BLOWER | 42 | 6 |

FIG. 12

| POWER-SAVING STAGE | REFERENCE AVAILABILITY(%) | ELECTRIC COMPONENTS | OPERATION LIMITATION |
|---|---|---|---|
| 1 | 80 | ELECTRIC ASSISTANT HEATER -> REAR WINDOW HEATER | DELAY TURN-ON TIME |
| | 78 | REAR WINDOW HEATER -> ELECTRIC ASSISTANT HEATER | DELAY TURN-ON TIME |
| | 76 | FRONT & REAR SEAT HEATERS -> FRONT & REAR ARMREST HEATERS | DELAY TURN-ON TIME |
| | 74 | FRONT & REAR ARMREST HEATERS -> FRONT & REAR SEAT HEATERS | DELAY TURN-ON TIME |
| 2 | 70 | FRONT SEAT HEATER -> REAR ARMREST HEATER | OPERATE WITH LOW POWER |
| | 68 | FRONT ARMREST HEATER -> REAR SEAT HATER | OPERATE WITH LOW POWER |
| | 66 | REAR SEAT HATER -> STEERING WHEEL HEATER | OPERATE WITH LOW POWER |
| | 64 | REAR ARMREST HEATER -> FRONT ARMREST HEATER | OPERATE WITH LOW POWER |
| | 56 | STEERING WHEEL HEATER -> FRONT SEAT HEATER | OPERATE WITH LOW POWER |
| 3 | 50 | SIDE-VIEW MIRROR HEATERS -> REAR WINDOW HEATER | CUT OFF |
| | 48 | STEERING WHEEL HEATER -> SIDE-VIEW MIRROR HEATERS | CUT OFF |
| | 44 | FRONT & REAR ARMREST HEATERS -> ELECTRIC ASSISTANT HEATER | CUT OFF |
| | 40 | FRONT & REAR SEAT HEATERS -> FRONT BLOWER | CUT OFF |
| | 38 | ELECTRIC ASSISTANT HEATER -> STEERING WHEEL HEATER | CUT OFF |
| | 36 | REAR WINDOW HEATER -> FRONT & REAR ARMREST HEATERS | CUT OFF |
| | 30 | FRONT BLOWER -> FRONT & REAR SEAT HEATERS | CUT OFF |

FIG. 14

| POWER-SAVING STAGE | REFERENCE AVAILABILITY(%) | ELECTRIC COMPONENTS | OPERATION LIMITATION |
|---|---|---|---|
| 1 | 80 | ELECTRIC ASSISTANT HEATER | DELAY TURN-ON TIME |
| | 76 | – | – |
| | 76 | FRONT & REAR SEAT HEATERS | DELAY TURN-ON TIME |
| | 74 | FRONT & REAR ARMREST HEATERS | DELAY TURN-ON TIME |
| | 72 | REAR WINDOW HEATER | DELAY TURN-ON TIME |
| 2 | 70 | FRONT SEAT HEATER | OPERATE WITH LOW POWER |
| | 68 | FRONT ARMREST HEATER | OPERATE WITH LOW POWER |
| | 66 | REAR SEAT HATER | OPERATE WITH LOW POWER |
| | 64 | REAR ARMREST HEATER | OPERATE WITH LOW POWER |
| | 56 | STEERING WHEEL HEATER | OPERATE WITH LOW POWER |
| 3 | 50 | SIDE-VIEW MIRROR HEATERS | CUT OFF |
| | 48 | STEERING WHEEL HEATER | CUT OFF |
| | 44 | FRONT & REAR ARMREST HEATERS | CUT OFF |
| | 40 | FRONT & REAR SEAT HEATERS | CUT OFF |
| | 38 | ELECTRIC ASSISTANT HEATER | CUT OFF |
| | 36 | – | – |
| | 30 | FRONT BLOWER | CUT OFF |
| | 26 | REAR WINDOW HEATER | CUT OFF |

FIG. 16

| POWER-SAVING STAGE | REFERENCE AVAILABILITY(%) | ELECTRIC COMPONENTS | OPERATION LIMITATION |
|---|---|---|---|
| 1 | 80 | ELECTRIC ASSISTANT HEATER | DELAY TURN-ON TIME |
| | 78 | REAR WINDOW HEATER | DELAY TURN-ON TIME |
| | 76 | FRONT & REAR SEAT HEATERS | DELAY TURN-ON TIME |
| | 74 | FRONT & REAR ARMREST HEATERS | DELAY TURN-ON TIME |
| 2 | 70 | FRONT SEAT HEATER | OPERATE WITH LOW POWER |
| | 68 | FRONT ARMREST HEATER | OPERATE WITH LOW POWER |
| | 66 | REAR SEAT HATER | OPERATE WITH LOW POWER |
| | 64 | REAR ARMREST HEATER | OPERATE WITH LOW POWER |
| | 62 | STEERING WHEEL HEATER | OPERATE WITH LOW POWER |
| 3 | 50 | SIDE-VIEW MIRROR HEATERS | CUT OFF |
| | 48 | STEERING WHEEL HEATER | CUT OFF |
| | 44 | FRONT & REAR ARMREST HEATERS | CUT OFF |
| | 40 | FRONT & REAR SEAT HEATERS | CUT OFF |
| | 38 | ELECTRIC ASSISTANT HEATER | CUT OFF |
| | 36 | REAR WINDOW HEATER | CUT OFF |
| | 30 | - | - |
| | 28 | FRONT BLOWER | OPERATE WITH LOW POWER |
| | 20 | FRONT BLOWER | CUT OFF |

FIG. 18

| POWER-SAVING STAGE | REFERENCE AVAILABILITY(%) | ELECTRIC COMPONENTS | OPERATION LIMITATION |
|---|---|---|---|
| | 80 | - | - |
| 1 | 78 | REAR WINDOW HEATER -> ELECTRIC ASSISTANT HEATER | DELAY TURN-ON TIME |
| | 76 | FRONT & REAR SEAT HEATERS -> FRONT & REAR ARMREST HEATERS | DELAY TURN-ON TIME |
| | 74 | FRONT & REAR ARMREST HEATERS -> FRONT & REAR SEAT HEATERS | DELAY TURN-ON TIME |
| | 72 | REAR WINDOW HEATER | DELAY TURN-ON TIME |
| 2 | 70 | FRONT SEAT HEATER -> REAR ARMREST HEATER | OPERATE WITH LOW POWER |
| | 68 | FRONT ARMREST HEATER -> REAR SEAT HATER | OPERATE WITH LOW POWER |
| | 66 | REAR SEAT HATER -> STEERING WHEEL HEATER | OPERATE WITH LOW POWER |
| | 64 | REAR ARMREST HEATER -> FRONT ARMREST HEATER | OPERATE WITH LOW POWER |
| | 56 | STEERING WHEEL HEATER -> FRONT SEAT HEATER | OPERATE WITH LOW POWER |
| | 50 | - | - |
| | 48 | STEERING WHEEL HEATER -> 사이드 미러 히터 | CUT OFF |
| | 44 | FRONT & REAR ARMREST HEATERS -> ELECTRIC ASSISTANT HEATER | CUT OFF |
| | 40 | - | - |
| 3 | 38 | ELECTRIC ASSISTANT HEATER -> STEERING WHEEL HEATER | CUT OFF |
| | 36 | REAR WINDOW HEATER -> FRONT & REAR ARMREST HEATERS | CUT OFF |
| | 30 | FRONT BLOWER -> FRONT & REAR SEAT HEATERS | CUT OFF |
| | 28 | FRONT BLOWER | OPERATE WITH LOW POWER |
| | 26 | REAR WINDOW HEATER | CUT OFF |
| | 20 | FRONT BLOWER | CUT OFF |

VEHICLE AND CONTROL METHOD THEREOF

CROSS-REFERENCE TO RELATED APPLICATION

This application claims the benefit of Korean Patent Application No. 10-2016-0153858, filed on Nov. 18, 2016 in the Korean Intellectual Property Office, the disclosure of which is incorporated herein by reference.

BACKGROUND

1. Field of the Disclosure

The present disclosure relates to a vehicle and a control method thereof, and more particularly, to a vehicle capable of minimizing inconvenience due to power limitation, and a control method thereof.

2. Description of the Related Art

In general, a vehicle is a type of transportation that travels on a road or a rail using fossil fuel or electricity as a power source. A vehicle generally includes various electric components to protect a driver and provide the driver with convenience and entertainment. For example, the vehicle includes electric components consuming a substantial amount of power, such as driving assistance system, a seat heating wire, etc. As a result, the power consumption of battery for supplying power to a starter motor increases so that the engine may not start or the battery life may be reduced.

SUMMARY

Therefore, it is an aspect of the present disclosure to provide a vehicle capable of limiting the operations of electric components based on the availability of battery, and a control method of the vehicle. It is another aspect of the present disclosure to provide a vehicle capable of minimizing a driver's inconvenience due to the operation limitation of electric components, and a control method of the vehicle. Additional aspects of the disclosure will be set forth in part in the description which follows and, in part, will be obvious from the description, or may be learned by practice of the disclosure.

In accordance with one aspect of the present disclosure, a vehicle may include a generator configured to generate power, a plurality of electric components configured to receive the power from the generator, a battery configured to store a part of the power generated by the generator, and a body control module configured to calculate power availability from an amount of power generation of the generator, an amount of charge of the battery, and an amount of power consumption of the plurality of electric components, and to limit operations of the plurality of electric components in a first order when the power availability is less than predetermined reference availability. The body control module may change the first order to a second order based on at least one of a driver's use rates of the plurality of electric components, external environment information, and the driver's or a passenger's health information, and limit the operations of the plurality of electric components in the second order.

The body control module may further be configured to store hours of use (e.g., period of time of use) of the plurality of electric components according to an exterior temperature and humidity. The body control module may be configured to calculate use rates of the plurality of electric components based on the external environment information from the hours of use of the plurality of electric components and driving hours of the vehicle. The body control module may also be configured to limit the operations of the plurality of electric components in the ascending order of the use rates of the plurality of electric components.

The vehicle may further include an environment information collecting apparatus configured to collect the external environment information. The body control module may be configured to limit the operations of the plurality of electric components in the second order according to the external environment information. The environment information collecting apparatus may include at least one of a temperature sensor, a humidity sensor, and a rain sensor.

The vehicle may further include a health information collecting apparatus configured to collect the driver's or passenger's health information. The body control module may be configured to limit the operations of the electric components in the second order according to the driver's or passenger's health information The driver's or passenger's health information may include at least one of the driver's or passenger's temperature, sweat, heart rate, pulse, blood sugar, blood pressure, and disease degree. Additionally, the body control module may be configured to delay turn-on times of the plurality of electric components in the second order and reduce the outputs of the plurality of electric components in the second order. The body control module may then be configured to stop the operations of the plurality of electric components in the second order.

In accordance with one aspect of the present disclosure, a method of controlling a vehicle may include calculating power availability from an amount of power generation of a generator, an amount of charge of a battery, and an amount of power consumption of a plurality of electric components, limiting operations of the plurality of electric components in a first order when the power availability is less than predetermined reference availability, and limiting the operations of the plurality of electric components in a second order based on at least one of a driver's use rates of the electric components, external environment information, and the driver's or a passenger's health information.

The method may further include storing hours of use of the plurality of electric components based on an exterior temperature and humidity. The method may further include calculating use rates of the plurality of electric components according to the external environment information from the hours of use of the plurality of electric components and driving hours of the vehicle. The limiting of the operations of the plurality of electric components in the second order may include limiting the operations of the plurality of electric components in the ascending order of the use rates of the plurality of electric components.

The external environment information may include at least one of outside temperature, outside humidity, and information about whether it rains. The driver's or passenger's health information may include at least one of the driver's or passenger's temperature, sweat, heart rate, pulse, blood sugar, blood pressure, and disease degree. Additionally, the limiting of the operations of the plurality of electric components in the second order may include delaying turn-on times of the plurality of electric components in the second order, reducing the outputs of the plurality of electric components in the second order, and stopping the operations of the plurality of electric components in the second order.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 8 is a view for describing an example of limiting the operations of electric components according to the operation limitation method of FIG. 7 according to an exemplary embodiment of the present disclosure;

FIG. 12 is a view for describing an example of limiting the operations of electric components according to the operation limitation method shown in FIG. 10 according to an exemplary embodiment of the present disclosure;

FIG. 14 is a view for describing an example of limiting the operations of electric components according to the operation limitation method shown in FIG. 13 according to an exemplary embodiment of the present disclosure;

FIG. 16 is a view for describing an example of limiting the operations of electric components according to the operation limitation method shown in FIG. 15 according to an exemplary embodiment of the present disclosure;

FIG. 18 is a view for describing an example of limiting the operations of the electric components 30 according to the operation limitation method shown in FIG. 17 according to an exemplary embodiment of the present disclosure.

DETAILED DESCRIPTION

Figure 1:
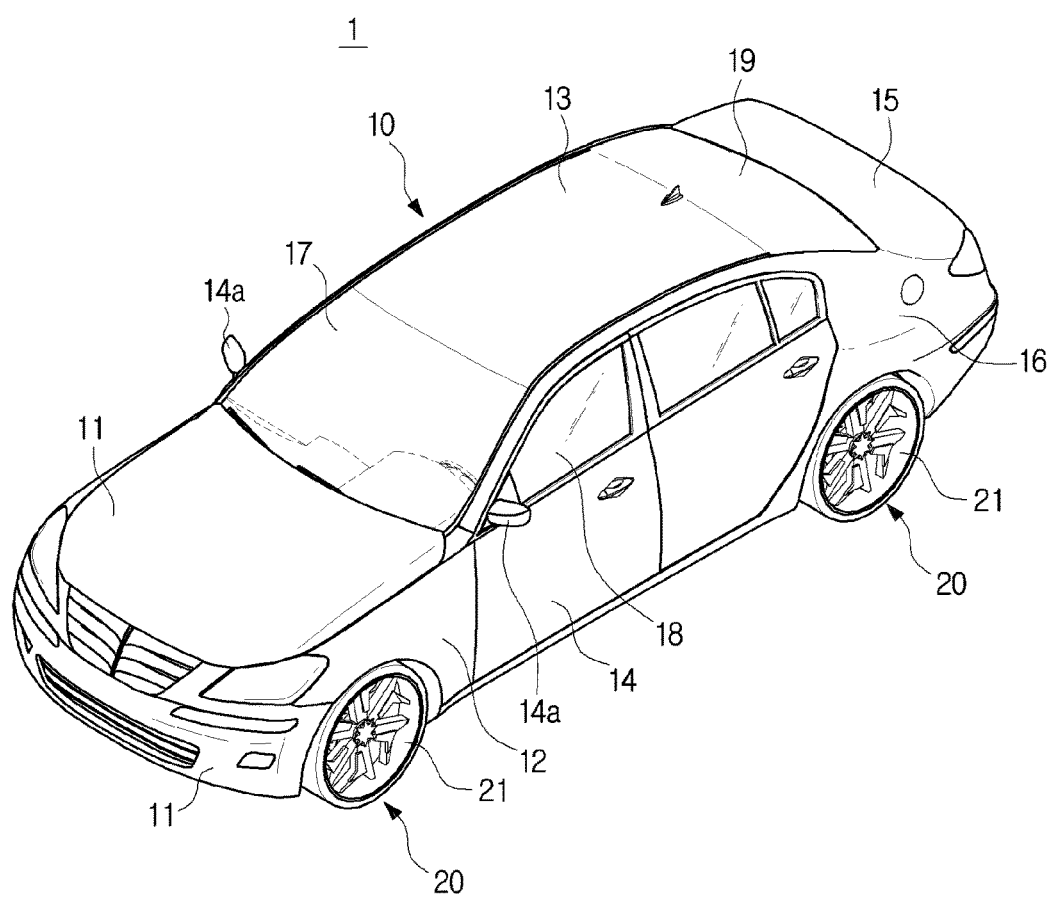
FIG. 1 shows the body of a vehicle according to an exemplary embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These exemplary embodiments are provided so that this disclosure will be thorough and complete and will fully convey the exemplary embodiments to those of ordinary skill in the art. Like numerals denote like elements throughout.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It will be understood that, although the terms first, second, etc. may be used herein to describe various elements, these elements should not be limited by these terms. These terms are only used to distinguish one element from another. It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. The terminology used herein is for the purpose of describing particular embodiments only and is not intended to be limiting.

Reference will now be made in detail to the exemplary embodiments of the present disclosure, examples of which are illustrated in the accompanying drawings, wherein like reference numerals refer to like elements throughout. Hereinafter, the operation principle and embodiments of the present disclosure will be described in detail with reference to the accompanying drawings.

A vehicle is mechanical/electrical equipment used to transport humans and/or objects using the torque of an engine and/or a motor. The engine of the vehicle converts translational energy generated by explosively burning fossil fuel, such as gasoline, diesel, gas, and the like, into rotational energy. The vehicle moves using torque generated by an internal combustion engine.

The vehicle may include a starter motor for starting the engine, a battery for supplying electrical energy to the starter motor, and a generator for supplying electrical energy to a starter battery using the torque of the engine. The vehicle may also include various types of electric components to provide a driver with safety and convenience, wherein the electric components may receive electrical energy from the starter battery. Since the electric components consume electrical energy, the battery may be discharged. To prevent the battery from being excessively discharged when the starter motor is not capable of being driven, it is necessary to adjust the amount of charge of the battery.

Figure 2:
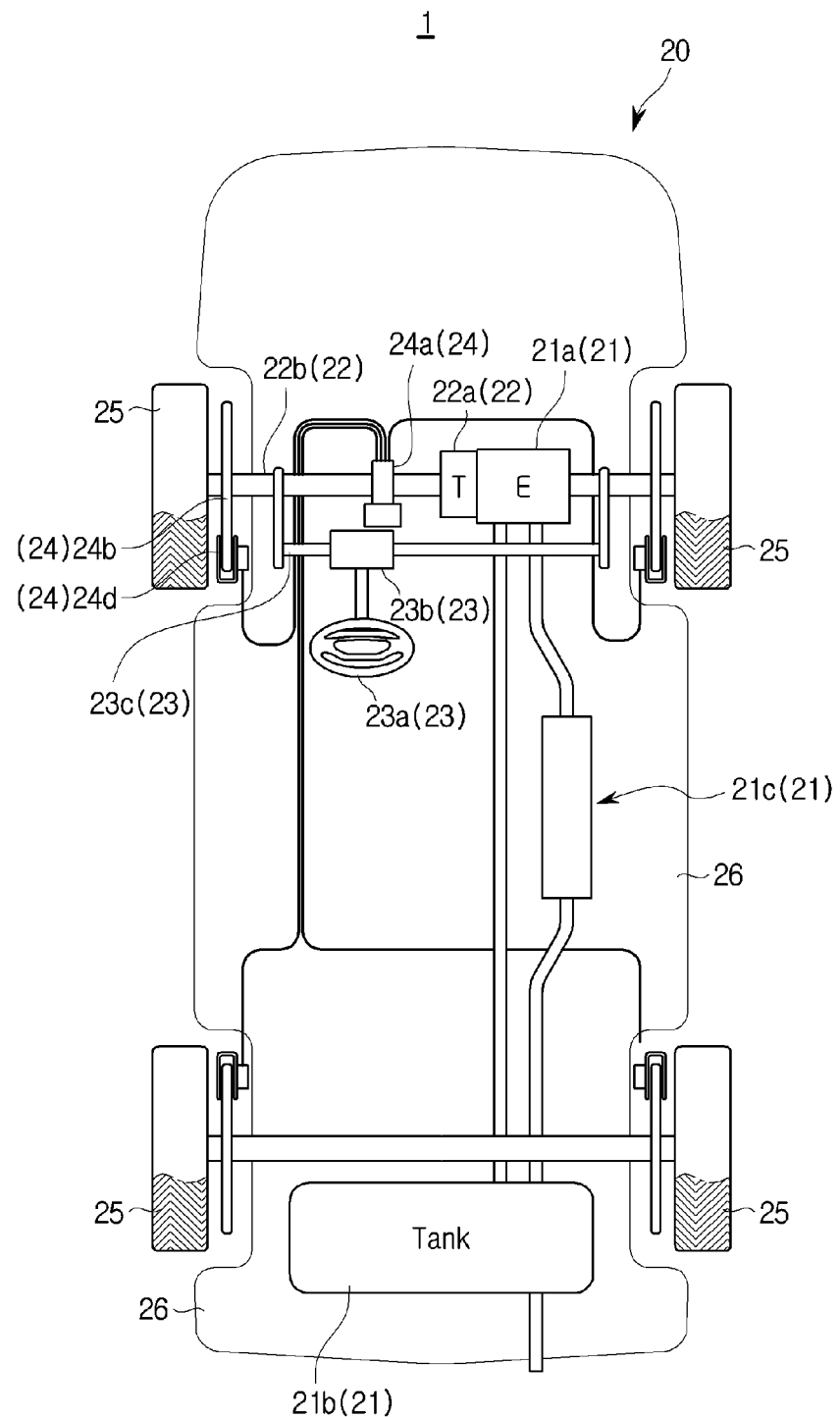
FIG. 2 shows the chassis of a vehicle according to an exemplary embodiment of the present disclosure.
Figure 3:
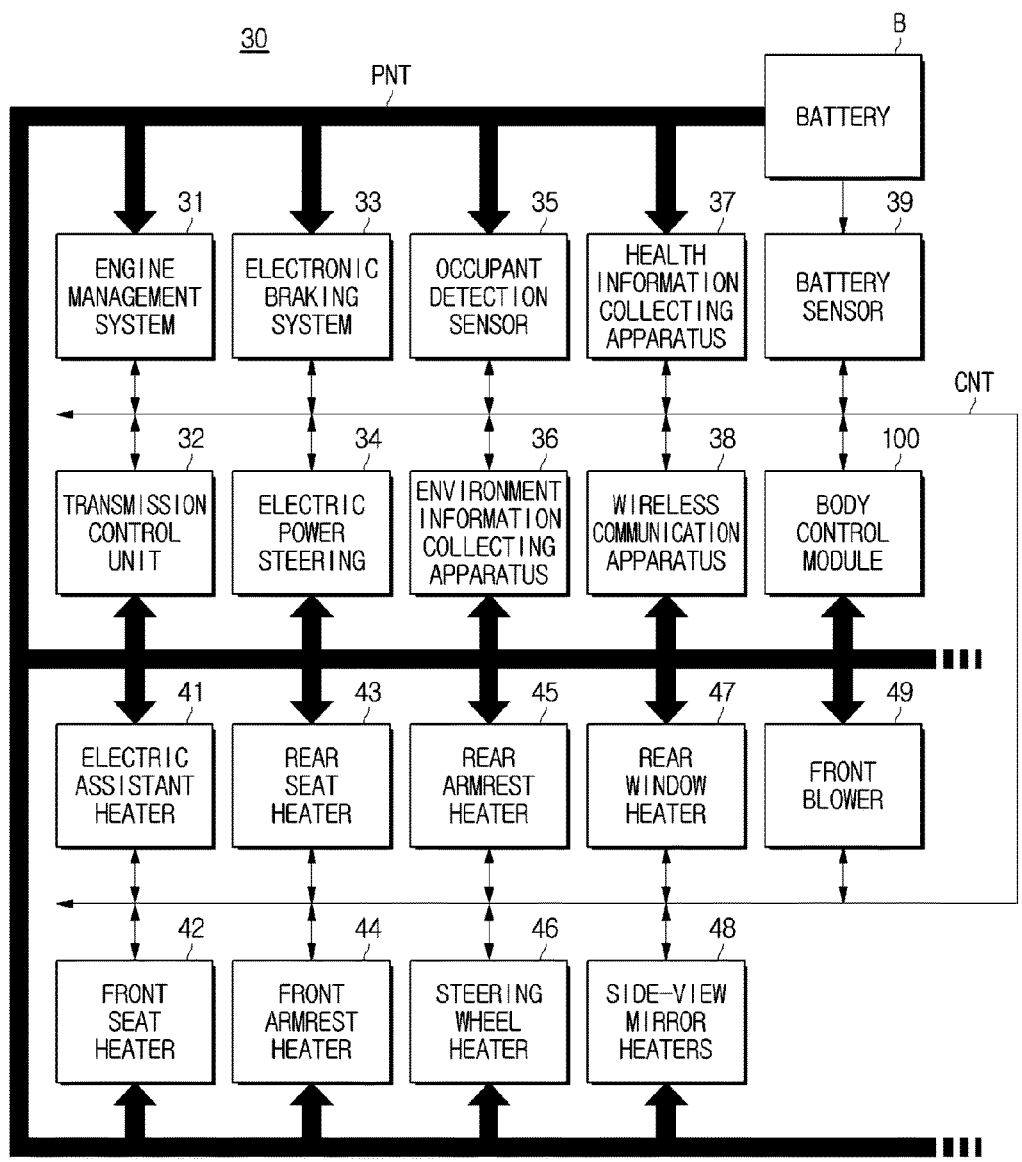
FIG. 3 shows electric components of a vehicle according to an exemplary embodiment of the present disclosure.
Figure 4:
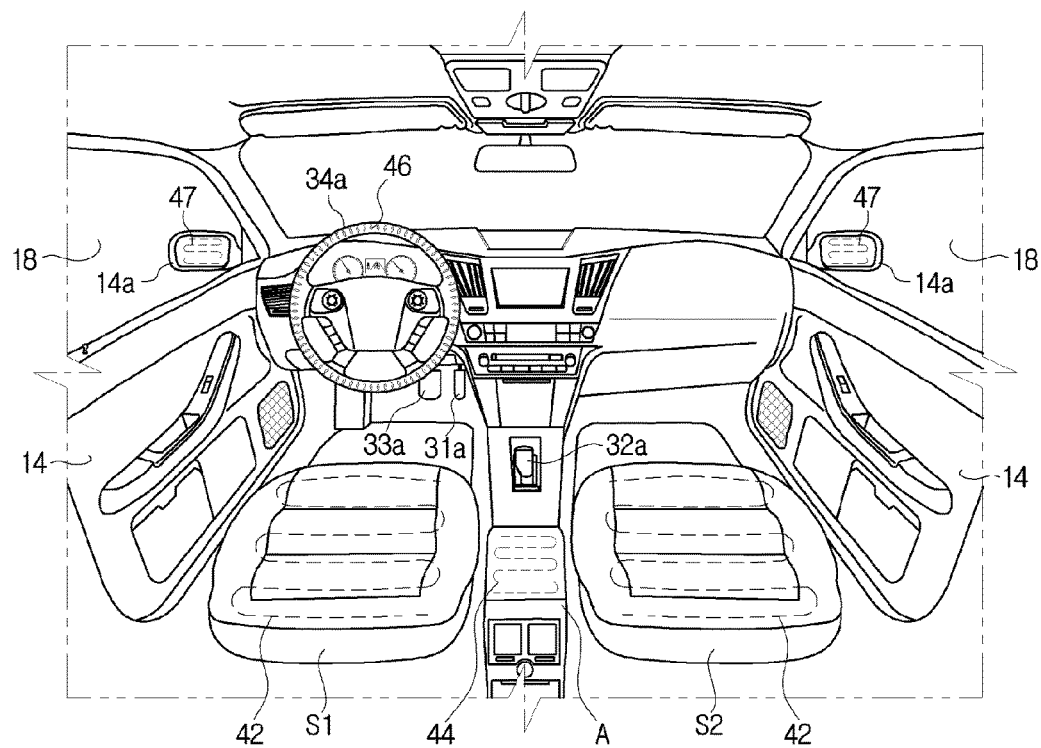
FIG. 4 shows the interior of a vehicle according to an exemplary embodiment of the present disclosure.

Hereinafter, a method of controlling a vehicle and an amount of charge of a battery included in the vehicle will be described. FIG. 1 shows the body of a vehicle according to an exemplary embodiment of the present disclosure. FIG. 2 shows the chassis of a vehicle according to an exemplary embodiment of the present disclosure. FIG. 3 shows electric components of a vehicle according to an exemplary embodiment of the present disclosure. Also, FIG. 4 shows the interior of a vehicle according to an exemplary embodiment of the present disclosure.

Referring to FIGS. 1, 2, 3, and 4, a vehicle 1 may include a body 10 that forms the outer appearance of the vehicle 1 and accommodates a driver and/or baggage, a chassis 20 including power generation system, power transfer system, brake system, steering system, wheels, etc., and a plurality of electric components 30 configured to protect the driver and to provide the driver with convenience.

As shown in FIG. 1, the body 10 may form the interior space of the vehicle in which the driver and passenger may be seated, an engine room to accommodate the engine, and a trunk room to accommodate luggage or other objects. The body 10 may include a hood 11, front fenders 12, a roof panel 13, doors 14, a trunk lid 15, and quarter panels 16. To ensure the driver's visibility, the body 10 may also include a front window 17 in the front portion, side windows 18 in the sides, and a rear window 19 in the rear portion of the vehicle.

As shown in FIG. 2, the chassis 20 may include a power generation system 21, a power transfer system 22, a steering system 23, a brake system 24, and wheels 25 to allow the vehicle 1 to travel according to the driver's control. The chassis 20 may further include a frame 26 to fix the power generation system 21, the power transfer system 22, the steering system 23, the brake system 24, and the wheels 25. The power generation system 21 may be configured to generate torque required for the vehicle 1 to travel, and may include an engine 21a, a fuel supply apparatus 21b, and exhaust system 21c. The power transfer system 22 may be configured to transfer torque generated by the power generation system 21 to the wheels 25, and may include a clutch/transmission 22a, a gearshift 32a, a differential gear, and a driving shaft 22b.

Further, the steering system 23 may be configured to adjust the driving direction of the vehicle 1, and may include a steering wheel 23a, a steering gear 23b, and a steering link 23c. The brake system 23 may be configured to stop rotation of the wheels 25, and may include a brake pedal, a master cylinder 24a, a brake disc 24b, and a brake pad 24c. The wheels 25 may receive torque from the power generation system 21 through the power transfer system 22 to move the vehicle 1. The wheels 25 may include front wheels disposed in the front portion of the vehicle 1, and rear wheels disposed in the rear portion of the vehicle 1. The vehicle 1 may include various electric components 30 for operating the vehicle 1 and providing the driver and passenger with safety and convenience, in addition to the above-described mechanical components.

As shown in FIGS. 3 and 4, the vehicle 1 may include engine management system (EMS) 31, a transmission control unit (TCU) 32, electronic braking system (EBS) 33, electric power steering (EPS) 34, an occupant detection sensor (ODS) 35, an environment information collecting apparatus 36, a health information collecting apparatus 37, a wireless communication apparatus 38, a battery sensor 39, and a body control module (BCM) 100. The various components may all be operated by a controller having a processor and a memory. In addition, the vehicle 1 may include an electric assistant heater 41, a front seat heater 42, a rear seat heater 43, a front armrest heater 44, a rear armrest heater 45, a steering wheel heater 46, a rear window heater 47, side-view mirror heaters 48, and a front blower 49, for the driver's convenience. A battery B may be provided to supply power to the electric components 30.

The EMS 31 may be configured to operate the engine and manage the engine, in response to the driver's acceleration command received through an accelerator pedal 31a. For example, the EMS 31 may be configured to perform engine torque control, fuel efficiency control, and engine failure diagnosis. The TCU 32 may be configured to operate the transmission in response to the driver's gear-shifting command received through the gearshift 32a or in response to the driving speed of the vehicle 1. For example, the transmission control unit 32 may be configured to perform transmission control, clutch control, and engine torque control during gear-shifting.

The EBS 33 may be configured to operate the brake system of the vehicle 1 and maintain the balance of the vehicle 1, in response to the driver's brake command received through a brake pedal 33a. For example, the EBS 33 may include anti-lock brake system (ABS) and electric stability control (ESC). The EPS 34 may assist the driver to more easily manipulate the steering wheel 34a. For example, the EPS 34 may assist the driver's steering manipulation by decreasing steering torque upon low-speed driving or parking and increasing steering torque upon high-speed driving. The ODS 35 may be disposed in each of seats S1 and S2 of the vehicle 1 to detect a driver and/or passenger located on the seat S1 and/or S2. For example, the ODS 35 may be configured to detect pressure applied by a driver and/or passenger sat on the seat S1 and/or S2 (e.g., the sensor may be configured to detect a pressure difference on the seat to thus detect a passenger).

The environment information collecting apparatus 36 may be configured to collect information regarding the inside and/or outside environment of the vehicle 1. For example, the environment information collecting apparatus 36 may include a humidity sensor configured to measure the inside and/or outside humidity of the vehicle 1, a temperature sensor configured to measure the inside and/or outside temperature of the vehicle 1, and a rain sensor configured to detect rain and/or snow. Each sensor may then be configured to transmit the detected information to the environment information collecting apparatus 36.

The health information collecting apparatus 37 may be configured to collect the driver's and/or passenger's biometric information. For example, the health information collecting apparatus 37 may be configured to measure the driver's or passenger's temperature, sweat, heart rate, or pulse using a sensor installed in the steering wheel 23a. The health information collecting apparatus 37 may include a wearable device that collects the driver's and/or passenger's biometric information, and measures the driver's and/or passenger's blood sugar and blood pressure using the wearable device. Additionally, the health information collecting apparatus 37 may be configured to acquire the driver's or passenger's disease information from an external medical server via the wireless communication apparatus 38.

The wireless communication apparatus 38 may be configured to communicate with an apparatus other than the vehicle 1. For example, the wireless communication apparatus 38 may be configured to transmit/receive data to/from a base station that provides a wireless communication service or to/from another vehicle. Particularly, the wireless communication apparatus 38 may be configured to transmit/receive data to/from an external medical server via a base station or another vehicle to receive the driver's and/or passenger's biometric information, disease information, etc. from the external medical server.

The battery B may be configured to store electrical energy generated from the torque of the engine, and supply power to the electric components 30 included within the vehicle 1. For example, when the vehicle 1 travels, the generator G may be configured to convert the rotational energy of the engine into electrical energy, and the battery B may be configured to receive the electrical energy from the generator G and store the electrical energy. Additionally, during the parking of the vehicle 1, the battery B may be configured to supply power for starting the engine to a starter motor M, or supply power to the electric components 30 of the vehicle 1.

The battery sensor 39 may be configured to acquire various information related to the battery B. For example, the battery sensor 39 may be configured to acquire battery state information, such as the rated capacity of the battery B, the State of Charge (SoC) of the battery B, the State of Health (SoH) of the battery B, the output voltage of the battery B, the output current of the battery B, the temperature of the battery B, etc. The BCM 100 may be configured to operate the electric components 30 to provide the driver with convenience or to ensure the driver's safety. For example, the BCM 100 may be configured to operate the electric assistant heater 41, the front seat heater 42, the rear seat heater 43, the front armrest heater 44, the rear armrest heater 45, the steering wheel heater 46, the rear window heater 47, the side-view mirror heaters 48, the front blower 49, etc., installed in the vehicle 1.

The electric assistant heater 41 may be configured to assist an air conditioner included in the vehicle 1 upon heating by the air conditioner. The electric assistant heater 41 may be configured to heat the inside air of the vehicle 1 before the cooling water of the engine 21a is sufficiently heated. The front and rear seat heaters 42 and 43 may be installed in the driver seat S1 and the passenger seat S2 to heat the seats S1 and S2 based on the driver's manipulation and/or the temperatures of the seats S1 and S2. The front and rear armrest heaters 44 and 45 may be installed in an armrest A between the driver seat S1 and the passenger seat S2 to heat the armrest A based on the driver's manipulation and/or the temperature of the armrest A.

The steering wheel heater 46 may be installed in the steering wheel 34a to heat the steering wheel 34a based on the driver's manipulation and/or the temperature of the steering wheel 34a. The rear window heater 47 may be disposed on the rear window 19 to heat the rear window 19 to thus remove moisture and/or frost formed on the rear window 19. The side-view mirror heaters 48 may be disposed on side-view mirrors 14a to heat the side-view mirrors 14a to thus remove moisture and/or frost formed on the side-view mirrors 14a. The front blower 49 may blow air heated or cooled by the air conditioner to the inside of the vehicle 1. For example, the front blower 49 may be configured to suction the inside air of the vehicle 1 and discharge air heated or cooled by the air conditioner. The front blower 49 may also include a filter to eliminate foreign materials included in air to be discharged.

The electric components 30 may be configured to communicate with each other via a communication network (CNT) for vehicle. For example, the electric components 30 may be configured to transmit/receive data to/from each other via the Ethernet, media oriented systems transport (MOST), Flexray, controller area network (CAN), local interconnect network (LIN), or the like. Additionally, the electric components 30 may be configured to receive power from the batter B via a power network (PNT) for vehicle. As described above, the battery B may be configured to supply power to the electric components 30 upon traveling or parking of the vehicle 1. Operation in which the battery B supplies power to the electric components 30 will be described in detail, below.

Figure 5:
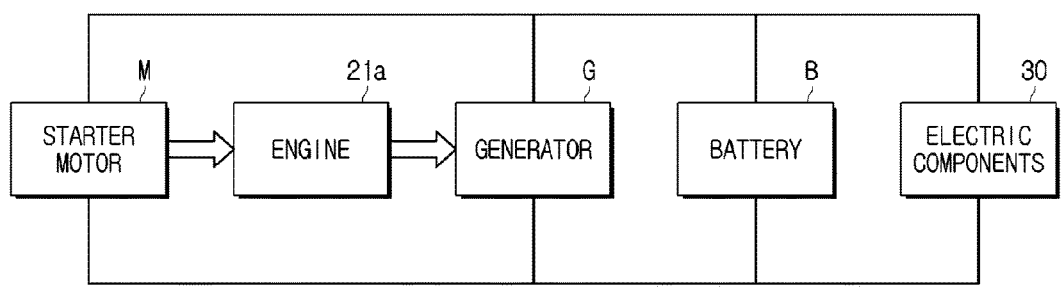
FIG. 5 shows power system of a vehicle according to an exemplary embodiment of the present disclosure.

FIG. 5 shows power system of a vehicle according to an exemplary embodiment of the present disclosure. As shown in FIG. 5, the vehicle 1 may include the starter motor M, the engine 21a, the generator G, the battery B, and the electric components 30. The starter motor M may provide torque to the engine 21a to start the engine 21a when the engine 21a does not operate. The starter motor M may be configured to receive power from the battery B, and consume a substantial amount of power to start the engine 21a. Accordingly, the battery B may need to maintain a predetermined level of power (for example, SoC of about 80%) or more to start the start motor M.

The engine 21a may be configured to generate power for moving the vehicle 1. More specifically, the engine 21a may be configured to generate torque by an explosive combustion of fuel, and the torque of the engine 21a may be transferred to the wheels 25 via the transmission 22a. The vehicle 1 may move by rotation of the wheels 25. A part of the torque generated by the engine 21 may be provided to the generator G. The generator G may be configured to receive the torque from the engine 21a, and generate electrical energy, that is, power from the torque of the engine 21a. The generator G may also be configured to adjust an amount of power generation based on the driving state of the vehicle 1 and the SoC of the battery B.

For example, the generator G may be in the form of a motor having a rotor and a stator both including a coil, wherein the rotor may be configured to rotate by the torque of the engine 21a, and the stator may be fixed without rotating. When current is supplied to the coil of the rotor when the rotor is rotating, a rotating magnetic field may be formed, and an electromotive force may be generated in the coil of the stator due to the rotating magnetic field. The generator G may be configured to generate power using the electromotive force. In addition, the magnitude of the magnetic field may change according to the magnitude of current that is supplied to the coil of the rotor, and the electromagnetic force generated in the coil of the stator may also change accordingly. By using the phenomenon, the generator G may adjust a generation amount of power.

A part of power (e.g., a first amount or some of the power) generated by the generator G may be supplied to the electric components 30 of the vehicle 1, and the other part of the power (e.g., a remaining amount) may be stored in the battery B of the vehicle 1. In other words, power generated by the generator G may be supplied to the electric components 30, and the remaining power may be stored in the battery B. The battery B may be configured to receive power from the generator G, and store the received power in the form of chemical energy. The battery B may also be configured to supply power for starting the engine 21a when the engine 21a stops, to the starter motor M.

Further, the battery B may be configured to receive power from the generator G, and supply power to the electric components 30. For example, since the generator G is not capable of generating power upon parking when the engine 21a stops, the battery B may be configured to supply power to the electric components 30. When power consumed by the electric components 30 is greater than that generated by the generator G, the battery B may be configured to supply power to the electric components 30. Accordingly, the generator G and the battery B may be configured to supply power to the electric components 30 complementarily. The electric components 30 may receive power from the generator G and/or the battery B to adjust the configurations of the vehicle 1 or to provide the driver with safety and convenience. More specifically, the BCM 100 may be configured to operate the electric components 30 to provide the driver with safety and convenience. Furthermore, the BCM 100 may be configured to adjust consumption power of the electric components 30 to maintain the amount of charge of the battery B capable of starting the starter motor M.

Figure 6:
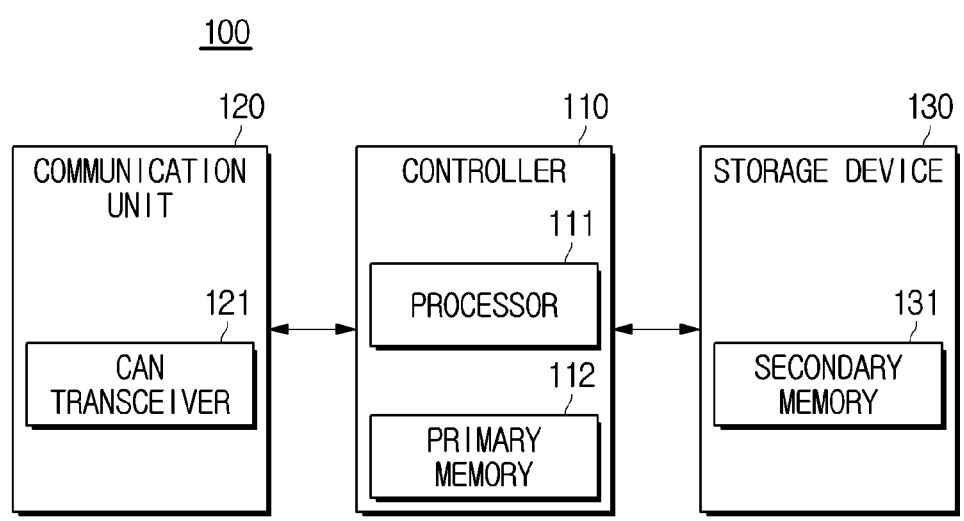
FIG. 6 shows a configuration of a BCM included in a vehicle according to an exemplary embodiment of the present disclosure.

Hereinafter, the configuration of the BCM 100 will be described. FIG. 6 shows a configuration of a BCM included in a vehicle according to an exemplary embodiment of the present disclosure. As shown in FIG. 6, the BCM 100 may include a communication unit 120, a storage device 130, and a controller 110.

The communication unit 120 may include a CAN transceiver 121 configured to receive a communication signal from the electric components 30 via a CNT, and to transmit a communication signal to the electric components 30. The CAN transceiver 121 may be configured to receive an analog communication signal via the CNT, convert the analog communication signal to digital communication data, and then output the digital communication data to the controller 110. In addition, the CAN transceiver 121 may be configured to receive digital communication data from the controller 110, convert the digital communication data into an analog communication signal, and then transmit the analog communication signal via the CNT. Accordingly, the communication unit 120 may be configured to transmit/receive data to/from the electric components 30 of the vehicle 1 via the CNT, and the BCM 100 may be configured to communicate with the electric components 30 of the vehicle 1 via the communication unit 120.

The storage device 130 may include secondary memory 131 to store control data and control programs for operating the BCM 100. The secondary memory 131 may include non-volatile memory in which data is not lost even when no power is supplied thereto. The secondary memory 131 may be configured to store data or delete stored data, according to a control signal from the controller 130. The secondary memory 131 may include a hard disc drive (HDD) or a solid state drive (SSD). The controller 110 may include primary memory 112 to store control data and execute programs for operating the BCM 100, and a processor 111 to generate a control signal according to the control programs and the control data stored in the primary memory 112.

The primary memory 112 may be configured to temporarily store communication data received via the communication unit 120, or temporarily store the control programs and control data stored in the storage device 130. Additionally, the primary memory 112 may provide a program and/or data to the processor 111 according to a control signal from the processor 111. The primary memory 112 may include volatile memory, such as static random access memory (SRAM), dynamic random access memory (DRAM), and the like. The primary memory 112 may also include non-volatile memory, such as read only memory (ROM) to store programs for booting or power-on reset of the BCM 100, erasable programmable read only memory (EPROM), electrically erasable programmable read only memory (EEPROM), and the like.

The processor 111 may include various logic circuits and arithmetic circuits, and process data according to a program provided from the primary memory 112 and generate a control signal according to the result of the processing. For example, the processor 111 may be configured o process data related to the generator G, data related to the battery B, and data related to operations of the electric components 30, and generate a control signal for adjusting power consumption of the electric components 30. Accordingly, the controller 110 may be configured to collect data related to the vehicle 1 via the communication unit 120, process the data according to the programs stored in the storage device 130, and thus generate a control signal for adjusting power consumption of the electric components 30.

More specifically, the controller 110 may be configured to calculate the availability of power that the electric components 30, from the data related to the generator G, the data related to the battery B, and the data related to the operations of the electric components 30, and generate a control signal for adjusting power consumption of the electric components 30 according to the calculated availability of power. An amount of power which the electric components 30 may be currently supplied is referred to as an available amount of power, and the controller 110 may be configured to calculate an available amount of power using Equation (1), below.

$$\text{Available Amount of Power} = \text{Amount of Generation} + \text{Amount of Charge} - \text{Amount of Consumption}, \quad (1)$$

wherein the amount of generation represents an amount of power currently generated by the generator G, the amount of charge represents an amount of power currently stored in the battery B, the amount of consumption represents an amount of power currently consumed by the electric components 30, and the available amount of power represents an amount of power which the electric components 30 are currently capable of using.

Accordingly, the available amount of power may be calculated from the amount of generation, the amount of charge, and the amount of consumption. The amount of generation may be calculated from the revolutions per minute (RPM) of the generator G and the temperature and voltage of the generator G, and the amount of charge may be calculated from the SoC of the battery B. Additionally, the amount of consumption may be calculated from operation information of the electric components 30 or the output current of the battery B. An amount of power which the electric components 30 may be maximally supplied is referred to as a maximum available amount, and the controller 110 may be configured to calculate a maximum available amount using Equation (2), below.

$$\text{Maximum Available Amount} = \text{Maximum Amount of Generation} + \text{Maximum Amount of Charge} - \text{Basic Amount of Consumption}, \quad (2)$$

wherein the maximum amount of generation represents an amount of power which the generator G is capable of generating maximally, the maximum amount of charge represents an amount of power capable of being maximally stored in the battery B, the basic amount of consumption represents an amount of power basically consumed by the electric components 30, and the maximum available amount represents an amount of power which the electric components 30 are capable of using maximally.

Accordingly, the maximum available amount may be calculated from the maximum amount of generation, the maximum amount of charge, and the basic amount of consumption. The maximum amount of generation, the maximum amount of charge, and the basic amount of consumption may be acquired in advance through an experiment. In addition, a ratio of an amount of power which the electric components 30 may be currently supplied with respect to an amount of power which the electric components 30 may be maximally supplied, that is, a ratio of an available amount with respect to a maximum available amount is referred to as power availability. The controller 110 may be configured to calculate power availability using Equation (3), below.

$$\text{Availability} = \frac{\text{Available Amount}}{\text{Maximum Available Amount}} \times 100, \quad (3)$$

wherein the available amount represents an amount of power which the electric components 30 are currently capable of using, the maximum available amount represents an amount of power which the electric components 30 are capable of using maximally, the availability represents a ratio of an amount of power which the electric components 30 may currently be supplied with respect to an amount of power which the electric components 30 may be maximally supplied.

The availability represents a ratio of power which the generator G and the battery B are currently supplying to the electric components 30 with respect to maximum power which the generator G and the battery B may supply maximally to the electric components 30, and the availability may be used as an index representing the power-supply state of the vehicle 1. In other words, when the availability is high, the controller 110 may be configured to determine that the vehicle 1 is in a good (e.g., sufficient) power-supply state, and when the availability is low, the controller 110 may be configured to determine that the vehicle 1 is in a bad (e.g., insufficient) power-supply state.

Figure 7:
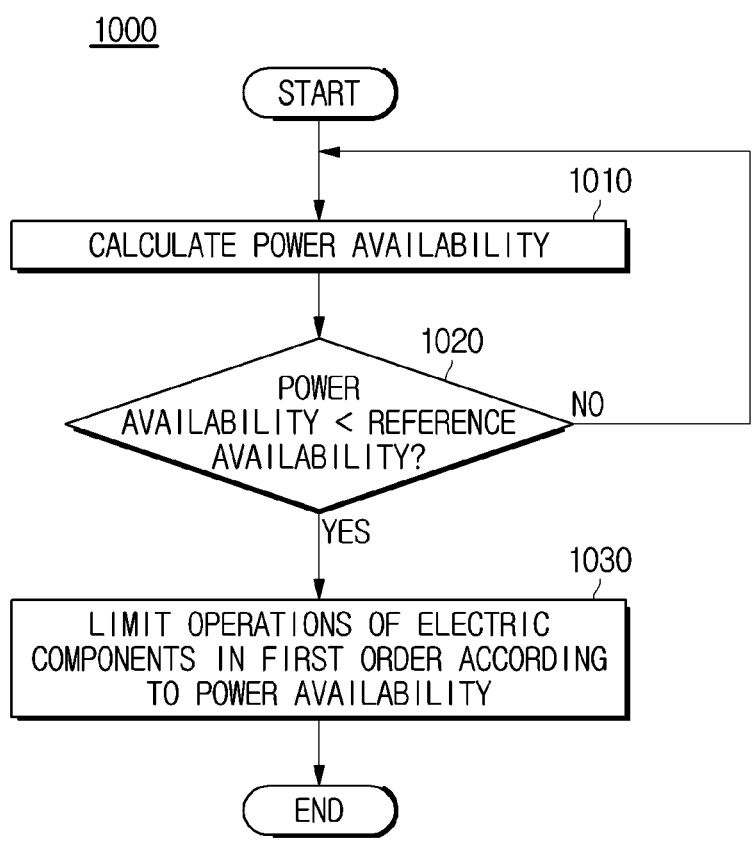
FIG. 7 shows an example of an operation limitation method of a vehicle according to an exemplary embodiment of the present disclosure.

Hereinafter, operation of the vehicle 1 will be described. FIG. 7 shows an example of an operation limitation method of a vehicle according to an exemplary embodiment of the present disclosure. Also, FIG. 8 is a view for describing an example of limiting the operations of electric components according to the operation limitation method of FIG. 7. Hereinafter, an operation limitation method 1000 of the vehicle 1 will be described with reference to FIGS. 7 and 8.

The vehicle 1 may be configured to calculate power availability of the electric components 30, in operation 1010. The BCM 100 of the vehicle 1 may be configured to calculate the availability of power which the electric components 30 are capable of using, from data related to the generator G, data related to the battery B, and data related to the operations of the electric components 30. More specifically, the BCM 100 may be configured to calculate an available amount of power from an amount of generation of the generator G, an amount of charge of the battery B, and an amount of power consumption of the electric components 30, using Equation (1), and calculate a maximum available amount from a maximum amount of generation of the generator G, a maximum amount of charge of the battery B, and a maximum amount of consumption of the electric components 30, using Equation (2). The BCM 100 may also be configured to calculate power availability from the available amount of power and the maximum available amount, using Equation (3).

Thereafter, the vehicle 1 may be configured to determine whether the power availability is less than predetermined reference availability, in operation 1020. The BCM 100 of the vehicle 1 may be configured to compare the power availability with the reference availability to determine whether the power availability is less than the reference availability. The reference availability represents availability at which operation of limiting power consumption of the electric components 30 starts. For example, when the operations of the electric components 30 are limited when power availability is 80%, the reference availability may be defined as 80%, as shown in FIG. 8.

When the BCM 100 determines that the power availability is greater than the reference availability ("No" in operation 1020), the vehicle 1 may again be configured to calculate power availability. When the BCM 100 determines that the power availability is less than the reference availability ("Yes" in operation 1020), the vehicle 1 may be configured to limit the operations of the electric components 30 in a predetermined first order according to the power availability, in operation 1030. In other words, based on the determination, the BCM 100 adjusts the operation of the components. When the BCM 100 determines that the power availability is less than the reference availability, it may be determined that the vehicle 1 is in a bad power-supply state (e.g., insufficient power/battery state). In other words, when the power availability is less than the reference availability, the vehicle 1 may expect that the amount of charge of the battery B is reduced since the amount of power consumption of the electric components 30 is greater than the amount of generation of the generator G.

Accordingly, the BCM 100 of the vehicle 1 may be configured to limit the operations of the electric components 30 to reduce the power consumption of the electric components 30. For example, the BCM 100 may be configured to limit the operations of the electric components 30 in stages based on the power availability, to reduce the power consumption of the electric components 30. In other words, the BCM 100 may be configured to limit the operations of the individual electric components 30 when the power availability is less than the reference availability of the corresponding electric components 30. For example, when the power availability is less than 80%, the BCM 100 may be configured to delay the turn-on times of the electric components 30 based on power-saving stage 1. For example, the BCM 100 may be configured to delay the turn-on times of the electric components 30 that are turned on/off periodically.

Furthermore, the BCM 100 may be configured to operate, for the driver's convenience, the electric assistant heater 41, the front and rear seat heaters 42 and 43, the front and rear armrest heaters 44 and 45, the steering wheel heater 46, the rear window heater 47, and the side-view mirror heaters 48 for an on-time period, and stop the operations of the electric assistant heater 41, the front and rear seat heaters 42 and 43, the front and rear armrest heaters 44 and 45, the steering wheel heater 46, the rear window heater 47, and the side-view mirror heaters 48 for an off-time period. When the power availability is less than 80%, the BCM 100 may be configured to delay the turn-on times of the electric components 30 in the order of the electric assistant heater 41, the rear window heater 47, the front and rear seat heaters 42 and 43, and the front and rear armrest heaters 44 and 45, according to the power availability, in the power-saving stage 1, as an example. The claimed disclosure, however, is not limited to this particular order.

For example, as shown in FIG. 8, when the power availability is less than 80%, the BCM 100 may be configured to delay the turn-on time of the electric assistant heater 41 by about 5 seconds to 10 seconds, and when the power availability is less than 78%, the BCM 100 may be configured to delay the turn-on time of the rear window heater 46 by about 10 seconds to 20 seconds. Additionally, when the power availability is less than 76%, the BCM 100 may be configured to delay the turn-on times of the front and rear seat heaters 42 and 43 by about 30 seconds to 60 seconds, and when the power availability is less than 74%, the BCM 100 may be configured to delay the turn-on times of the front and rear armrest heaters 44 and 45 by about 10 seconds to 20 seconds.

Further, when the power availability is less than 70%, the BCM 100 may be configured to operate the electric components 30 with low power according to power-saving stage 2. The BCM 100 may be configured to operate the electric components 30 with low power in the order of the front seat heater 42, the front armrest heater 44, the rear seat heater 43, the rear armrest heater 45, and the steering wheel heater 46. More specifically, the BCM 100 may be configured to reduce power supplied to the electric components 30.

For example, when the power availability is less than 70%, the BCM 100 may be configured to reduce the output of the front seat heater 42 by about 50%, and when the power availability is less than 68%, the BCM 100 may be configured to reduce the output of the front armrest heater 44 by about 50%. Additionally, when the power availability is less than 66%, the BCM 100 may be configured to reduce the output of the rear seat heater 43 by about 50%, and when the power availability is less than 64%, the BCM 100 may be configured to reduce the output of the rear armrest heater 45 by about 50%. When the power availability is less than 56%, the BCM 100 may be configured to reduce the output of the steering wheel heater 45 by about 50%.

When the power availability is less than 50%, the BCM 100 may be configured to stop the operations of the electric components 30 according to power-saving stage 3. The BCM 100 may specifically be configured to stop the operations of the electric components 30 in the order of the side-view mirror heaters 48, the steering wheel heater 46, the front and rear armrest heaters 44 ad 45, the front and rear seat heaters 42 and 43, the electric assistance heater 41, the rear window heater 47, and the front blower 49, according to the power availability.

For example, when the power availability is less than 50%, the BCM 100 may be configured to stop the operations of the side-view mirror heaters 48, and when the power availability is less than 48%, the BCM 100 may be configured to stop the operation of the steering wheel heater 46. When the power availability is less than 44%, the BCM 100 may be configured to stop the operations of the front and rear armrest heaters 44 and 45, and when the power availability is less than 40%, the BCM 100 may be configured to stop the operations of the front and rear seat heaters 42 and 43. Additionally, when the power availability is less than 38%, the BCM 100 may be configured to stop the operation of the electric assistant heater 41, and when the power availability is less than 36%, the BCM 100 may be configured to stop the operation of the rear window heater 46. When the power availability is less than 30%, the BCM 100 may be configured to stop the operation of the front blower 49.

As described above, the vehicle 1 may be configured to limit the operations of the electric components 30 in stages based on power availability. The vehicle 1 may further be configured to delay the turn-on times of the electric components 30, reduce the outputs of the electric components 30, or stop the operations of the electric components 30, based on power availability. The vehicle 1 may be configured to limit the operations of the electric components 30 in stages to thereby prevent the amount of charge of the battery B from being sharply reduced.

However, limiting the operations of the electric components 30 in stages may cause driver inconvenience. In other words, when the operations of the electric components 30 are limited in stages, the driver may experience inconvenience. For example, the vehicle 1 may be configured to limit the operations of the electric components 30 all at once based on power availability although the driver and/or passenger prefers use of a specific electric component 30. Additionally, the vehicle 1 may be configured to limit the operations of the electric components 30 all at once based on power availability regardless of a weather condition, such as temperature, humidity, etc., and/or the driver's and/or passenger's health condition. Accordingly, the vehicle 1 may be configured to stop the operations of the electric components 30 or change the order of limiting the operations of the electric components 30, according to the driver's and/or passenger's use pattern of the electric components 30, a weather condition, such as temperature, humidity, etc., and/or the driver's and/or passenger's health condition. That is, the particular order of stopping or limiting the various components and which particular components are stopped or limited may be varied based on user preference.

Figure 9:
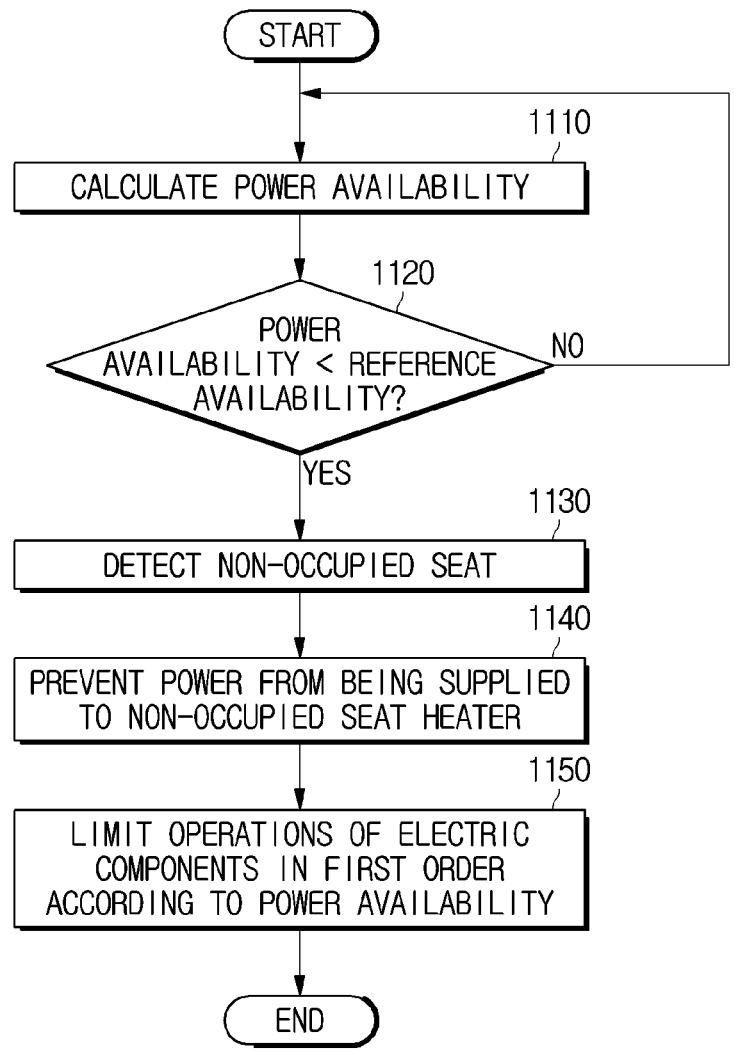
FIG. 9 shows another example of an operation limitation method of a vehicle according to an exemplary embodiment of the present disclosure.

FIG. 9 shows another example of an operation limitation method of a vehicle according to an exemplary embodiment of the present disclosure. Hereinafter, an operation limitation method 1100 of the vehicle 1 will be described with reference to FIG. 9. The method described herein below may be executed by a vehicle controller having a processor and a memory. The vehicle 1 may be configured to calculate power availability of the electric components 30, in operation 1110. Then, the vehicle 1 may be configured to determine whether the power availability is less than predetermined reference availability, in operation 1120.

Operation 1110 and operation 1120 may be the same as operation 1010 and operation 1020 of FIG. 7. Thereafter, the vehicle 1 may be configured to detect a non-occupied seat on which no driver and/or passenger sits (e.g., an empty seat based on a pressure detection), in operation 1130. The ODS 35 of the vehicle 1 may be configured to detect a driver and/or passenger on the seats S1 and S2 of the vehicle 1, and transfer the result of the detection to the BCM 100. For example, when the ODS 35 detects weight that is greater than or equal to predetermined weight (e.g., about 15 kg) from the seats S1 and S2, the ODS 35 may be configured to transmit an occupant detection signal to the BCM 100. When the BCM 100 receives the occupant detection signal, the BCM 100 may be configured to determine that a driver and/or passenger is located on the seats S1 and S2. When the ODS 35 fails to detect weight greater than or equal to the predetermined weight (e.g., about 15 kg) from the seats S1 and S2 (e.g., no pressure difference is detected on the seats, no pressure greater than 0), the ODS 35 may be configured to transmit an occupant non-detection signal to the BCM 100, and the BCM 100 may be configured to determine that no driver and/or passenger is on the seats S1 and S2.

Then, the vehicle 1 may prevent power from being supplied to the non-occupied seats on which no driver and/or passenger is detected, in operation 1140. When the BCM 100 of the vehicle 1 receives the occupant non-detection signal, the BCM 100 may prevent power from being supplied to a non-occupied seat. Particularly, although the driver inputs an operation command for the non-occupied seat, the BCM 100 may not operate the non-occupied seat. For example, when an occupant non-detection signal for the rear seat is received from the ODS 35, the BCM 100 may not operate the rear seat heater 43 although the driver operates the rear seat heater 43.

The vehicle 1 may be configured to limit the operations of the electric components 30 in a predetermined first order based on power availability, in operation 1150. When the power availability is less than the reference availability, it may be determined that the vehicle 1 is in a bad power-supply state (e.g., insufficient). In other words, when the power availability is less than the reference availability, an amount of charge of the battery B is reduced since an amount of power consumption of the electric components 30 is greater than an amount of power generation of the generator G.

Accordingly, the BCM 100 of the vehicle 1 may be configured to limit the operations of the electric components 30 in stages, to reduce the power consumption of the electric components 30. Detailed operations of the BCM 100 may be the same as operation 1130 of FIG. 7. As described above, the vehicle 1 may be configured to stop the operations of electric components for a seat on which no driver and/or passenger is detected, to reduce power consumption.

Figure 10:
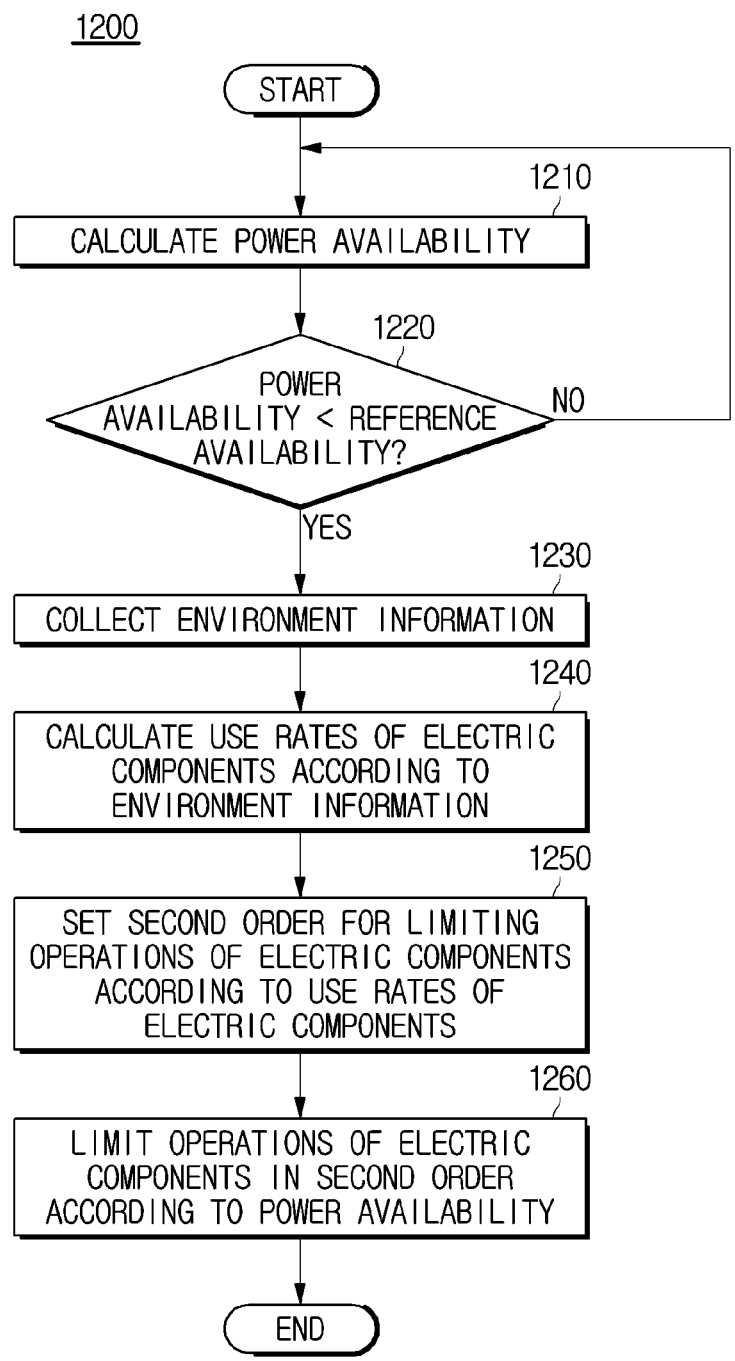
FIG. 10 shows another example of an operation limitation method of a vehicle according to an exemplary embodiment of the present disclosure.
Figure 11:
FIG. 11 is a view for describing an example of deciding the order of limiting the operations of electric components according to the operation limitation method shown in FIG. 10 according to an exemplary embodiment of the present disclosure.

FIG. 10 shows another example of an operation limitation method of a vehicle according to an exemplary embodiment of the present disclosure. FIG. 11 is a view for describing an example of deciding the order of limiting the operations of electric components according to the operation limitation method shown in FIG. 10. Also, FIG. 12 is a view for describing an example of limiting the operations of electric components according to the operation limitation method shown in FIG. 10. Hereinafter, an operation limitation method 1200 of the vehicle 1 will be described with reference to FIGS. 10, 11, and 12.

The vehicle 1 may be configured to calculate power availability of the electric components 30, in operation 1210. Then, the vehicle 1 may be configured to determine whether the power availability is less than predetermined reference availability, in operation 1220. Operation 1210 and operation 1220 may be the same as operation 1010 and operation 1020 of FIG. 7. Thereafter, the vehicle 1 may be configured to collect environment information, in operation 1230.

The environment information collecting apparatus 36 of the vehicle 1 may be configured to collect information regarding the inside and/or outside environment of the vehicle 1. For example, a humidity sensor of the environment information collecting apparatus 36 may be configured to measure the inside and/or outside humidity of the vehicle 1, a temperature sensor of the environment information collecting apparatus 36 may be configured to measure the inside and/or outside temperature of the vehicle 1, and a rain sensor of the environment information collecting apparatus 36 may be configured to detect snow and rain. Additionally, the environment information collecting apparatus 36 may be configured to receive weather condition information, such as temperature, humidity, snow/rain, etc., from an external weather server via the wireless communication apparatus 38.

The environment information collecting apparatus 36 may be configured to transmit the collected environment information to the BCM 100. The vehicle 1 may be configured to calculate use rates of the electric components 30 based on the environment information, in operation 1240. The BCM 100 of the vehicle 1 may then be configured to store hours of use of the electric components 30 based on environment information, in advance. For example, the BCM 100 may be configured to store hours of use of the front and rear seat heaters 42 and 43 when it rains, hours of use of the front and rear seat heater 42 and 43 according to outside temperature, etc., in advance, in the storage device 130.

Thereafter, the BCM 100 may be configured to receive the environment information from the environment information collecting apparatus 36, and calculate use rates of the electric components 30 from the previously stored hours of use of the electric components 30. For example, the BCM 100 may be configured to calculate use rates of the electric components 30 from the hours of use of the electric components 30 and driving hours of the vehicle 1, using Equation (4) below.

$$\text{Usage Rates of Electric Components} = \frac{\text{Hours of Use of Electric Components}}{\text{Driving Hours of Vehicle}} \times 100, \quad (1)$$

wherein the hours of use of the electric components 30 represent hours of use of the electric components 30 under a specific environment condition, the driving hours of the vehicle 1 represent driving hours of the vehicle 1 under the specific environment condition, and the use rates of the electric components 30 may represent a ratio of the hours of use of the electric components 30 with respect to the driving hours of the vehicle 1 under the specific environment condition.

For example, when outside temperature is about 3° C., and humidity is about 62%, the BCM 100 may be configured to acquire use rates of the electric components 30 from the hours of use of the electric components 30 stored in the storage device 130, as shown in FIG. 11. More specifically, when outside temperature is about 3° C., and humidity is about 62%, the front seat heater 42 may have a highest use rate of about 95%, and the rear window heater 46 may have a lowest use rate of about 10%.

The vehicle 1 may be configured to set a second order for limiting the operations of the electric components 30, in operation 1250. The BCM 100 of the vehicle 1 may be configured to set the second order for limiting the operations of the electric components 30 based on the use rates of the electric components 30. For example, as shown in FIG. 11, the BCM 100 may be configured to set the order of limiting the operations of the electric components 30 to the ascending order of the use rates of the electric components 30. More specifically, when outside temperature is about 3° C. and humidity is about 62%, the BCM 30 may be configured to limit the operations of the electric components 30 in the order of the rear window heater 47, the side-view mirror heaters 48, the rear armrest heater 45, the electric assistant heater 41, the rear seat heater 43, the front blower 49, the steering wheel heater 46, the front armrest heater 44, and the front seat heater 42.

The vehicle 1 may be configured to limit the operations of the electric components 30 in the second order according to power availability, in operation 1260. When the power availability is less than the reference availability, it may be determined that the vehicle 1 is in a bad power-supply state. Accordingly, the BCM 100 of the vehicle 1 may be configured to limit the operations of the electric components 30 in stages in the second order set in advance, to reduce the power consumption of the electric components 30. In other words, the BCM 100 may be configured to limit the operations of the individual electric components 30 when the power availability is less than the reference availability of the electric components 30.

For example, when the power availability is less than 80%, the BCM 100 may be configured to delay the turn-on times of the electric components 30 in the second order according to power-saving stage 1. The BCM 100 may specifically be configured to delay the turn-on times of the electric components 30 in the order of the rear window heater 47, the electric assistant heater 41, the front and rear armrest heaters 44 and 45, and the front and rear seat heaters 42 and 43, based on the power availability, as shown in FIG. 12.

When the power availability is less than 70%, the BCM 100 may be configured to operate the electric components 30 with low power in the second order according to power-saving stage 2. The BCM 100 may specifically be configured to operate the electric components 30 with low power in the order of the rear armrest heater 45, the rear seat heater 43, the steering wheel heater 46, the front armrest heater 44, and the front seat heater 42, based on the power availability, as shown in FIG. 12. Additionally, when the power availability is less than 50%, the BCM 100 may prevent the electric components 30 from operating in the second order according to power-saving stage 3. The BCM 100 may prevent the electric components 30 from operating, in the order of the rear window heater 47, the side-view mirror heaters 48, the electric assistant heater 41, the front blower 49, the steering wheel heater 46, the front and rear armrest heaters 44 and 45, and the front and rear seat heaters 42 and 43, based on the power availability.

By limiting the operations of the electric components 30 in stages, as described above, the vehicle 1 may prevent the amount of charge of the battery B from being sharply reduced. In addition, by changing the order of limiting the operations of the electric components 30 according to the driver's use rates of the electric components 30, the vehicle 1 may reflect the driver's use pattern to the operations of the electric components 30.

Figure 13:
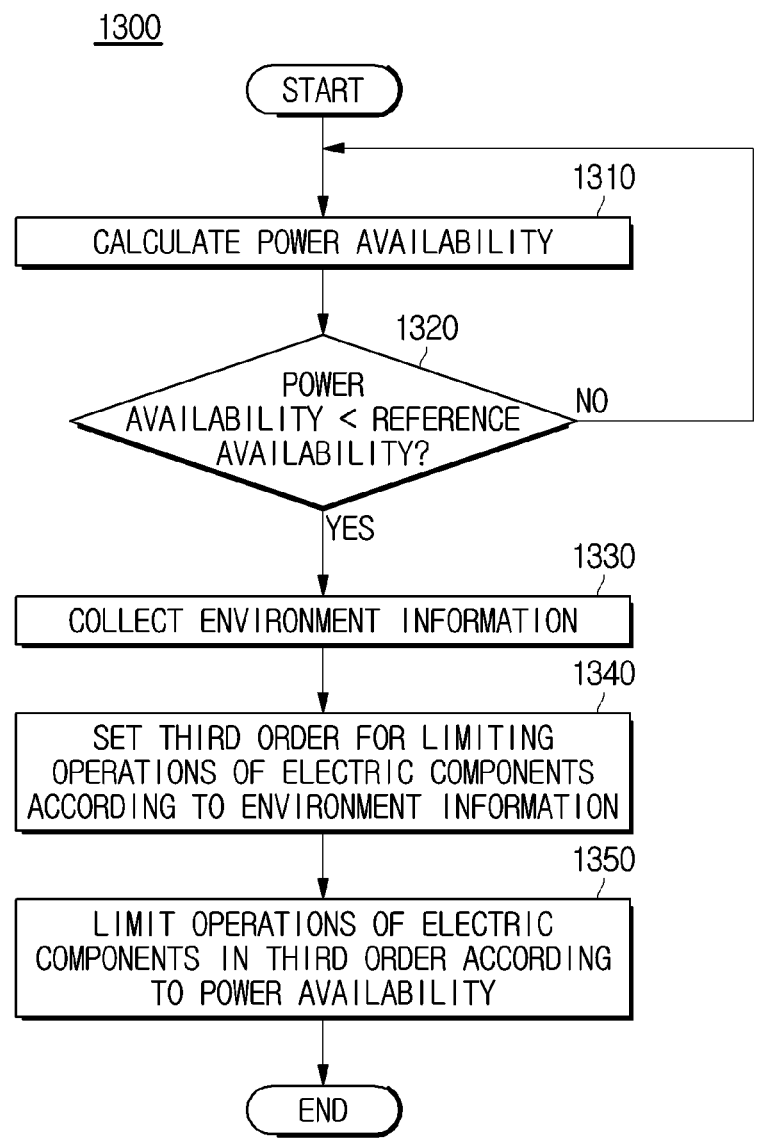
FIG. 13 shows another example of an operation limitation method of a vehicle according to an exemplary embodiment of the present disclosure.

FIG. 13 shows another example of an operation limitation method of a vehicle according to an exemplary embodiment of the present disclosure. Also, FIG. 14 is a view for describing an example of limiting the operations of electric components according to the operation limitation method shown in FIG. 13. Hereinafter, an operation limitation method 1300 of the vehicle 1 will be described with reference to FIGS. 13 and 14.

The vehicle 1 may be configured to calculate power availability of the electric components 30, in operation 1310. Then, the vehicle 1 may be configured to determine whether the power availability is less than predetermined reference availability, in operation 1320. Operation 1310 and operation 1320 may be the same as operation 1010 and operation 1020 of FIG. 7. The vehicle 1 may be configured to collect environment information, in operation 1330.

The environment information collecting apparatus 36 of the vehicle 1 may be configured to collect information regarding the inside and/or outside environment of the vehicle 1, and transmit the collected environment information to the BCM 100. The vehicle 1 may be configured to set a third order for limiting the operations of the electric components 30, in operation 1340. In particular, the BCM 100 of the vehicle 1 may be configured to set the third order for limiting the operations of the electric components 30 according to the environment information. For example, when the environment information collecting apparatus 36 detects rain, the BCM 100 may be configured to delay the order of limiting the operation of the rear window heater 47. More specifically, the BCM 100 may be configured to reduce or lower reference availability for limiting the operation of the rear window heater 47.

The vehicle 1 may be configured to limit the operations of the electric components 30 in the third order based on the power availability, in operation 1350. When the power availability is less than reference availability, the vehicle 1 may be determined to be in a bad power-supply state. Accordingly, the BCM 100 of the vehicle 1 may be configured to limit the operations of the electric components 30 in stages according to the third order set in advance, to reduce the power consumption of the electric components 30. In other words, when the power availability is less than the reference availability of the individual electric components 30, the BCM 100 may be configured to limit the operations of the electric components 30.

For example, when the power availability is less than about 80%, the BCM 100 may be configured to delay the turn-on times of the electric components 30 in the third order according to power-saving stage 1. Particularly, the BCM 100 may be configured to reduce reference availability for delaying the turn-on time of the rear window heater from about 47 to 72%. As a result, the BCM 100 may be configured to delay the turn-on times of the electric components 30 in the order of the electric assistant heater 41, the front and rear seat heaters 42 and 43, the front and rear armrest heaters 44 and 45, and the rear window heater 47, according to the power availability, as shown in FIG. 14.

Further, when the power availability is less than about 70%, the BCM 100 may be configured to operate the electric components 30 with low power, in the order of the front seat heater 42, the front armrest heater 44, the rear seat heater 43, the rear armrest heater 45, and the steering wheel heater 46, according to power-saving stage 2. When the power availability is less than about 50%, the BCM 100 may prevent the electric components 30 from operating, in the third order, according to power-saving stage 3. Particularly, the BCM 100 may be configured to reduce the reference availability of the rear window heater from about 47 to 26%. As a result, the BCM 100 may prevent the electric components 30 from operating, in the order of the side-view mirror heaters 48, the steering wheel heater 46, the front and rear armrest heater 44, and 45, the front and rear seat heaters 42 and 43, the electric assistant heater 41, the front blower 49, and the rear window heater 47, based on the power availability.

By limiting the operations of the electric components 30 in stages, as described above, the vehicle 1 may prevent the amount of charge of the battery B from being sharply reduced. In addition, by changing the order of limiting the operations of the electric components 30 according to environment information, the vehicle 1 may reflect a change of an external environment to the operations of the electric components 30.

Figure 15:
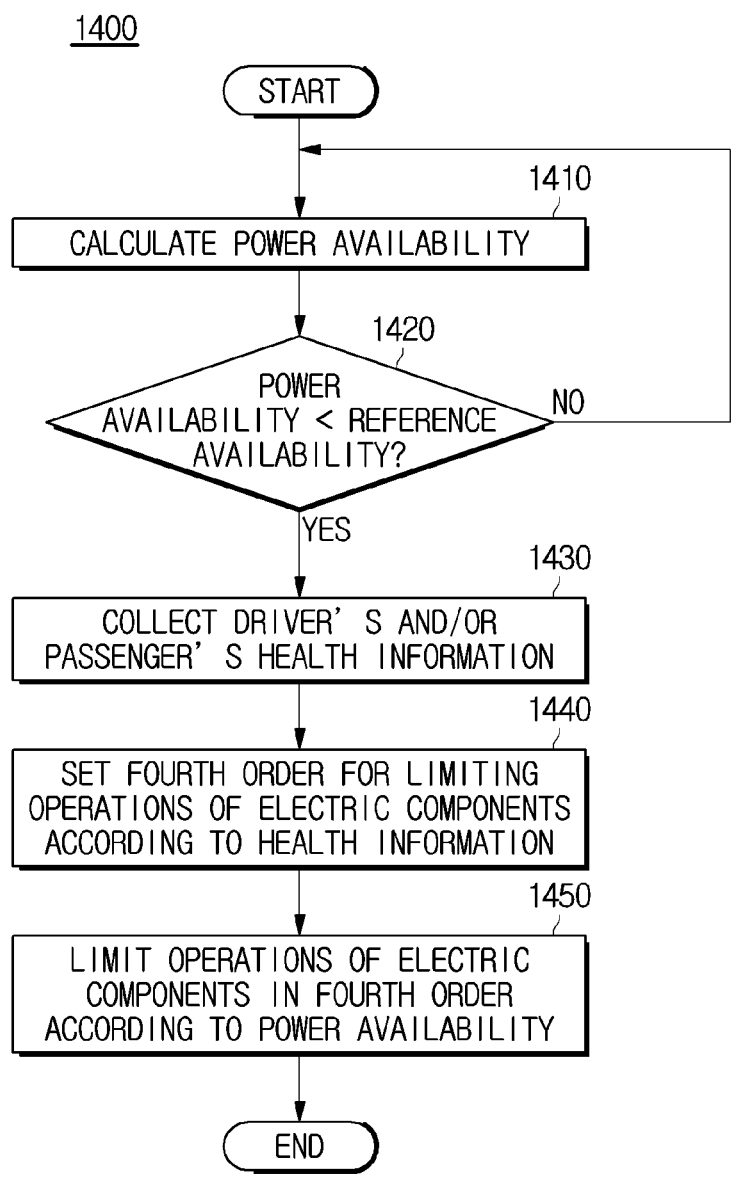
FIG. 15 shows another example of an operation limitation method of a vehicle according to an exemplary embodiment of the present disclosure.

FIG. 15 shows another example of an operation limitation method of a vehicle according to an exemplary embodiment of the present disclosure. Also, FIG. 16 is a view for describing an example of limiting the operations of electric components according to the operation limitation method shown in FIG. 15. Hereinafter, an operation limitation method 1400 of the vehicle 1 will be described with reference to FIGS. 15 and 16. The vehicle 1 may be configured to calculate power availability of the electric components 30, in operation 1410. Then, the vehicle 1 may be configured to determine whether the power availability is less than predetermined reference availability, in operation 1420. Operation 1410 and operation 1420 may be the same as operation 1010 and operation 1020 of FIG. 7.

The vehicle 1 may be configured to collect a driver's and/or passenger's health information, in operation 1430. The health information collecting apparatus 37 of the vehicle 1 may be configured to collect a driver's and/or passenger's biometric information using a sensor installed within the vehicle 1 and a wearable device provided separately from the vehicle 1 (e.g., a device worn by a driver or other user). For example, the health information collecting apparatus 37 may be configured to measure a driver's and/or passenger's temperature, sweat, heart rate, or pulse using a sensor installed within the steering wheel 23a, or measure the driver's and/or passenger's blood sugar, blood pressure, etc., using a wearable device. Additionally, the health information collecting apparatus 37 may be configured to acquire the driver's and/or passenger's disease information from an external medical server via the wireless communication apparatus 38.

The vehicle 1 may be configured to set a fourth order for limiting the operations of the electric components 30, in operation 1440. Specifically, the BCM 100 of the vehicle 1 may be configured to set the fourth order for limiting the operations of the electric components 30, based on the driver's and/or passenger's health information. For example, when the health information collecting apparatus 37 acquires information regarding a passenger's asthma, the BCM 100 may be configured to delay the order of limiting the operation of the front blower 49. More specifically, the BCM 100 may be configured to reduce or lower reference availability for limiting the operation of the front blower 49, and prevent the front blower 49 from stopping (e.g., maintain the operation of the front blower 49 in an on-state).

Furthermore, the vehicle 1 may be configured to limit the operations of the electric components 30 in the fourth order according to the power availability, in operation 1450. When the power availability is less than reference availability, the vehicle 1 may be determined to be in a bad power-supply state. Accordingly, the BCM 100 of the vehicle 1 may be configured to limit the operations of the electric components 30 in stages according to the fourth order set in advance, to reduce the power consumption of the electric components 30. In other words, when the power availability is less than reference availability of the individual electric components 30, the BCM 100 may be configured to limit the operations of the electric components 30.

For example, when the power availability is less than about 80%, the BCM 100 may be configured to delay the turn-on times of the electric components 30, in the order of the electric assistant heater 41, the rear window heater 47, the front and rear seat heaters 42 and 43, and the front and rear armrest heaters 44 and 45, according to power-saving stage 1. When the power availability is less than about 70%, the BCM 100 may be configured to operate the electric components 30 with low power, in the order of the front seat heater 42, the front armrest heater 44, the rear seat heater 43, the rear armrest heater 45, and the steering wheel heater 46, according to power-saving stage 2.

Additionally, when the power availability is less than about 50%, the BCM 100 may be configured to stop the operations of the electric components 30 in the fourth order according to power-saving stage 3. More specifically, the BCM 100 may be configured to reduce reference availability of the front blower from about 49 to 20%, and operate the front blower 49 with low power, instead of stopping the operation of the front blower 49. As a result, the BCM 100 may be configured to stop the operations of the electric components 30, in the order of the side-view mirror heaters 48, the steering wheel heater 46, the front and rear armrest heaters 44 and 45, the front and rear seat heaters 42 and 43, the electric assistant heater 41, and the rear window heater 47, according to the power availability, and operate the front blower 49 with low power. When the power availability is further decreased, the BCM 100 may be configured to stop the operation of the front blower 49.

By limiting the operations of the electric components 30 in stages, as described above, the vehicle 1 may prevent the amount of charge of the battery B from being sharply reduced. Additionally, by changing the order of limiting the operations of the electric components 30 according to the driver's and/or passenger's health information, the vehicle 1 may reflect the driver's and/or passenger's health condition to the operations of the electric components 30.

Figure 17:
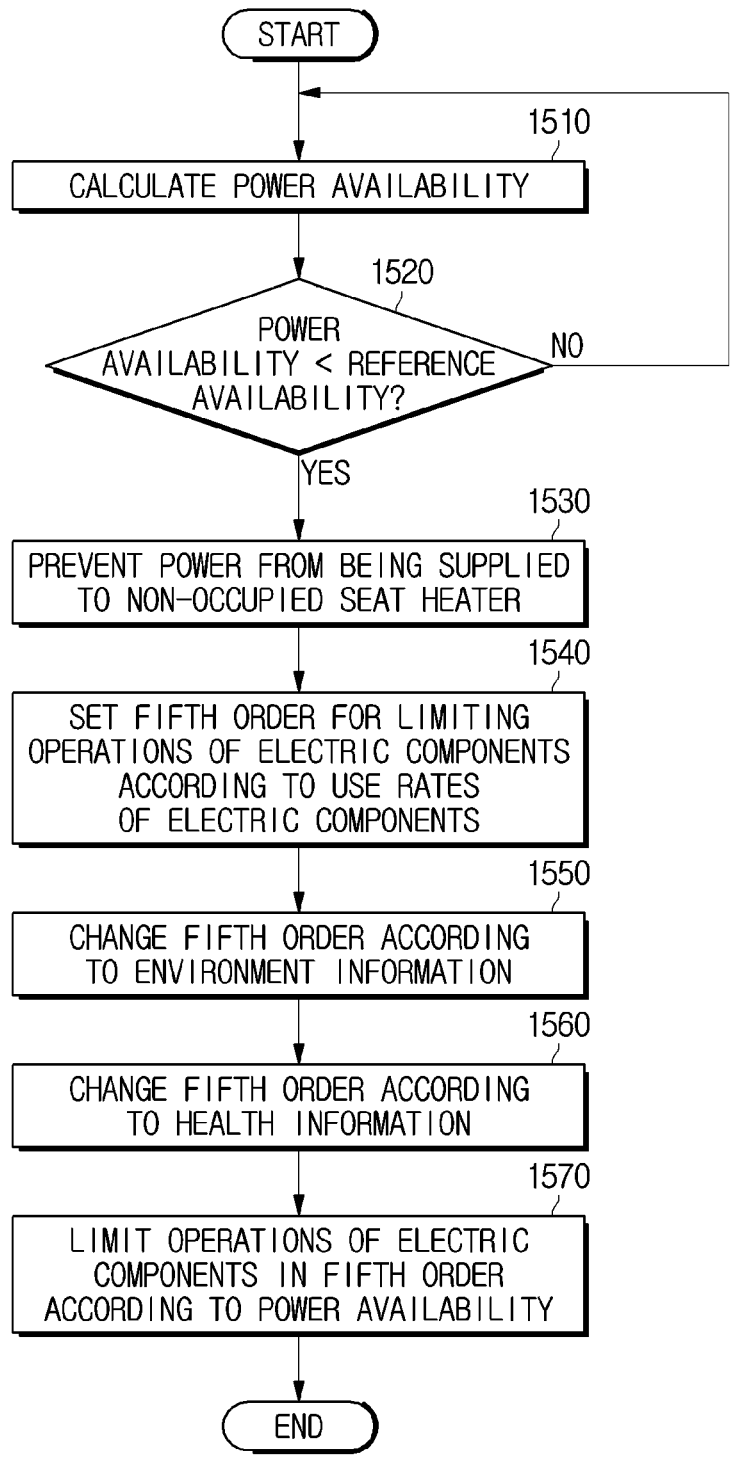
FIG. 17 shows another example of an operation limitation method of a vehicle according to an exemplary embodiment of the present disclosure.

FIG. 17 shows another example of an operation limitation method of a vehicle according to an exemplary embodiment of the present disclosure. Also, FIG. 18 is a view for describing an example of limiting the operations of the electric components 30 according to the operation limitation method shown in FIG. 17. Hereinafter, an operation limitation method 1500 of the vehicle 1 will be described with reference to FIGS. 17 and 18. The vehicle 1 may be configured to calculate power availability of the electric components 30, in operation 1510. Then, the vehicle 1 may be configured to determine whether the power availability is less than predetermined reference availability, in operation 1520. Operation 1510 and operation 1520 may be the same as operation 1010 and operation 1020 of FIG. 7.

Thereafter, the vehicle 1 may prevent power from being supplied to a non-occupied seat in which no driver and/or passenger is detected, in operation 1530. The ODS 35 of the vehicle 1 may be configured to detect a driver and/or passenger on the seats S1 and S2 of the vehicle 1, and transfer the result of the detection to the BCM 100. When the BCM 100 of the vehicle 1 receives an occupant non-detection signal, the BCM 100 of the vehicle 1 may prevent power from being supplied to a non-occupied seat. Particularly, although the driver inputs an operation command for the non-occupied seat, the BCM 100 may not operate the non-occupied seat, thus avoiding unnecessary operation when no passenger is actually detected.

The vehicle 1 may be configured to set a fifth order for limiting the operations of the electric components 30 according to use rates of the electric components 30, in operation 1540. The environment information collecting apparatus 36 of the vehicle 1 may be configured to collect information regarding the inside and/or outside environment of the vehicle 1, and transmit the collected environment information to the BCM 100. Additionally, the BCM 100 of the vehicle 1 may be configured to store hours of use of the electric components 30 based on the environment information, in advance. The BCM 100 may also be configured to receive the environment information from the environment information collecting apparatus 36, and calculate use rates of the electric components 30 from the previously stored hours of use of the electric components 30.

The BCM 100 may be configured to set the fifth order for limiting the operations of the electric components 30 according to the use rates of the electric components 30. For example, the BCM 100 may be configured to set the order of limiting the operations of the electric components 30 to the ascending order of the use rates of the electric components 30. The vehicle 1 may be configured to change the fifth order according to the environment information, in operation 1550. The environment information collecting apparatus 36 of the vehicle 1 may be configured to collect information regarding the inside and/or outside environment of the vehicle 1, and the BCM 100 may then be configured to change the fifth order for limiting the operations of the electric components 30 based on the environment information.

Further, the vehicle 1 may be configured to change the fifth order according to the driver's and/or passenger's health information, in operation 1560. The health information collecting apparatus 37 of the vehicle 1 may be configured to collect the driver's and/or passenger's biometric information using a sensor installed within the vehicle 1 and a wearable device provided separately from the vehicle 1, or acquire the driver's and/or passenger's disease information from an external medical server via the wireless communication apparatus 38. In addition, the BCM 100 of the vehicle 1 may be configured to change the fifth order for limiting the operations of the electric components 30 according to the driver's and/or passenger's health information.

The vehicle 1 may further be configured to limit the operations of the electric components 30 in the fifth order based on the power availability, in operation 1570. When the power availability is less than reference availability, the vehicle 1 may be determined to be in a bad power-supply state. Accordingly, the BCM 100 of the vehicle 1 may be configured to limit the operations of the electric components 30 in stages in the fifth order set in advance, to reduce the power consumption of the electric components 30. In other words, when the power availability is less than the reference availability of the individual electric components 30, the BCM 100 may be configured to limit the operations of the electric components 30.

For example, when the environment information collecting apparatus 36 detects outside temperature of about 3° C., humidity of about 62%, and rain, and the health information collecting apparatus 37 detects the driver's asthma, the BCM 100 may be configured to set the order of limiting the operations of the electric components 30, as shown in FIG. 18. First, the BCM 100 may be configured to set the order of limiting the operations of the electric components 30 according to use rates of the electric components 30. Then, the BCM 100 may be configured to change the fifth order according to the environment information, and change the fifth order according to the driver's and/or passenger's health information.

As a result, when the power availability is less than about 80%, as shown in FIG. 18, the BCM 100 may be configured to delay the turn-on times of the electric components 30, in the order of the electric assistant heater 41, the front and rear armrest heaters 44 and 45, the front and rear seat heaters 42 and 43, and the rear window heater 47, based on the power availability, in power-saving stage 1. When the power availability is less than about 70%, the BCM 100 may be configured to operate the electric components 30 with low power, in the order of the rear armrest heater 45, the rear seat heater 43, the steering wheel heater 46, the front armrest heater 44, and the front seat heater 42, according to power-saving stage 2.

Additionally, when the power availability is less than about 50%, the BCM 100 may be configured to stop the operations of the electric components 30 according to power-saving stage 3. The BCM 100 may specifically be configured to stop the operations of the electric components 30, in the order of the side-view mirror heaters 48, the electric assistant heater 41, the steering wheel heater 46, the front and rear armrest heaters 44 and 45, and the front and rear seat heaters 42 and 43, based on the power availability, and operate the front blower 49 with low power. When the power availability is further decreased, the BCM 100 may be configured to stop the operations of the rear window heater 47 and the front blower 49.

By limiting the operations of the electric components 30 in stages, as described above, the vehicle 1 may prevent the amount of charge of the battery B from being sharply reduced. Additionally, the vehicle 1 may be configured to change the order of limiting the operations of the electric components 30 according to the driver's use rates of the electric components 30, external environment information, and the driver's and/or passenger's health information. As a result, the vehicle 1 may be configured to adjust the power consumption of the electric components 30 according to the driver's taste, an external environment, and the driver's and/or passenger's health.

According to an aspect of the present disclosure, the vehicle is capable of limiting the operations of the electric components based on the availability of the battery. According to another aspect of the present disclosure, the vehicle is capable of minimizing a driver's inconvenience due to operation limitation of the electric components. Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device. With that being said, and in addition to the above described exemplary embodiments, embodiments may thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other exemplary embodiments can be devised which do not depart from the scope as disclosed herein. Accordingly, the scope should be limited only by the attached claims.

What is claimed is:

1. A vehicle, comprising:
    a generator configured to generate power;
    a plurality of electric components configured to receive the power from the generator;
    a battery configured to store a part of the power generated by the generator; and
    a body control module configured to calculate power availability from an amount of power generation of the generator, an amount of charge of the battery, and an amount of power consumption of the plurality of electric components, and to limit operations of the plurality of electric components in a first order when the power availability is less than predetermined reference availability,
    wherein the body control module is configured to change the first order to a second order according to at least one of use rates of the plurality of electric components and health information of a driver or a passenger, and limit the operations of the plurality of electric components in the second order.

2. The vehicle according to claim 1, wherein the body control module is configured to store hours of use of the plurality of electric components based on an outside temperature and outside humidity and calculate use rates of the plurality of electric components based on the external environment information from the hours of use of the plurality of electric components and driving hours of the vehicle.

3. The vehicle according to claim 2, wherein the body control module is configured to limit the operations of the plurality of electric components in the ascending order of the use rates of the plurality of electric components.

4. The vehicle according to claim 1, wherein the body control module is configured to stop the operations of the plurality of electric components in the second order.

5. The vehicle according to claim 1, further comprising:
    an environment information collecting apparatus configured to collect external environment information,
    wherein the body control module is configured to further change the first order to the second order according to the external environment information and limit the operations of the plurality of electric components in the second order according to the external environment information.

6. The vehicle according to claim 5, wherein the environment information collecting apparatus includes at least one of the group consisting of: a temperature sensor, a humidity sensor, and a rain sensor.

7. The vehicle according to claim 1, further comprising:
    a health information collecting apparatus configured to collect the health information,
    wherein the body control module is configured to limit the operations of the electric components in the second order according to the health information.

8. The vehicle according to claim 7, wherein the health information includes at least one of the group consisting of: temperature, sweat, heart rate, pulse, blood sugar, blood pressure, and disease degree of the driver or passenger.

9. The vehicle according to claim 1, wherein the body control module is configured to delay turn-on times of the plurality of electric components in the second order.

10. The vehicle according to claim 1, wherein the body control module is configured to reduce outputs of the plurality of electric components in the second order.

11. A method of controlling a vehicle, comprising:
    calculating, by a controller, power availability from an amount of power generation of a generator, an amount of charge of a battery, and an amount of power consumption of a plurality of electric components;
    limiting, by the controller, operations of the plurality of electric components in a first order when the power availability is less than predetermined reference availability; and
    limiting, by the controller, the operations of the plurality of electric components in a second order according to at least one of use rates of the electric components and health information of a driver or a passenger.

12. The method according to claim 11, wherein the limiting of the operations of the plurality of electric components in the second order includes stopping the operations of the plurality of electric components in the second order.

13. The method according to claim 11, further comprising:

storing, by the controller, hours of use of the plurality of electric components based on an outside temperature and outside humidity; and calculating, by the controller, use rates of the plurality of electric components based on the external environment information from the hours of use of the plurality of electric components and driving hours of the vehicle.

14. The method according to claim 13, wherein the limiting of the operations of the plurality of electric components in the second order includes limiting the operations of the plurality of electric components in the ascending order of the use rates of the plurality of electric components.

15. The method according to claim 11, wherein the limiting of the operations of the plurality of electric components in the second order includes reducing outputs of the plurality of electric components in the second order.

16. The method according to claim 11, further comprising limiting, by the controller, the operations of the plurality of electric components in the second order according to external environment information, wherein the external environment information includes at least one of the group consisting of: an outside temperature, an outside humidity, and information regarding whether rain is detected.

17. The method according to claim 11, wherein the health information includes at least one of the group consisting of: temperature, sweat, heart rate, pulse, blood sugar, blood pressure, and disease degree of the driver or passenger.

18. The method according to claim 11, wherein the limiting of the operations of the plurality of electric components in the second order includes delaying turn-on times of the plurality of electric components in the second order.

* * * * *